United States Patent
Wang et al.

(10) Patent No.: US 12,124,141 B2
(45) Date of Patent: Oct. 22, 2024

(54) ARRAY SUBSTRATE, LIQUID CRYSTAL DISPLAY PANEL AND DISPLAY DEVICE

(71) Applicant: Shanghai Tianma Microelectronics Co., Ltd., Shanghai (CN)

(72) Inventors: Cheng Wang, Shanghai (CN); Mingwei Zhang, Shanghai (CN); Yu Wang, Shanghai (CN)

(73) Assignee: Shanghai Tianma Microelectronics Co., Ltd., Shanghai (CN)

( * ) Notice: Subject to any disclaimer, the term of this patent is extended or adjusted under 35 U.S.C. 154(b) by 390 days.

(21) Appl. No.: 17/567,547

(22) Filed: Jan. 3, 2022

(65) Prior Publication Data

US 2022/0121057 A1    Apr. 21, 2022

(30) Foreign Application Priority Data

Jun. 29, 2021  (CN) .......................... 202110726999.8

(51) Int. Cl.
*G02F 1/1362* (2006.01)

(52) U.S. Cl.
CPC .... *G02F 1/13629* (2021.01); *G02F 1/136204* (2013.01)

(58) Field of Classification Search
None
See application file for complete search history.

(56) References Cited

FOREIGN PATENT DOCUMENTS

| CN | 103345914 A | 10/2013 |
|---|---|---|
| CN | 105096871 A | 11/2015 |
| CN | 106773424 A | 5/2017 |

*Primary Examiner* — Thanh Nhan P Nguyen
(74) *Attorney, Agent, or Firm* — KDW Firm PLLC

(57) ABSTRACT

Provided are an array substrate, a liquid crystal display panel and a display device. The array substrate includes a display area and a frame area, where the frame area includes a wiring area; a substrate; multiple signal lines; multiple connection lines, where the multiple connection lines include a first connection line, and the first connection line is located on a side of the signal line facing away from the substrate; a first wire changing layer, which is located between the display area and the wiring area, and is located on a side of the signal line and the connection line facing away from the substrate, the first wire changing layer is electrically connected to the signal line through a first via hole and is electrically connected to the first connection line through a second via hole.

18 Claims, 24 Drawing Sheets

ARRAY SUBSTRATE, LIQUID CRYSTAL DISPLAY PANEL AND DISPLAY DEVICE

CROSS-REFERENCE TO RELATED APPLICATION

This application claims priority to Chinese Patent Application No. 202110726999.8 filed Jun. 29, 2021, the disclosure of which is incorporated herein by reference in its entirety.

TECHNICAL FIELD

The present disclosure relates to a field of display technologies and, in particular, to an array substrate, a liquid crystal display panel and a display device.

BACKGROUND

The display panel has a circuit for driving the display panel to emit light, and the low-level voltage signal is a signal required by the circuit. Therefore, a low-level voltage signal line needs to be arranged in the display panel to implement the transmission of the low-level voltage signal. In the panel, the low-level signal sometimes needs to be transmitted by transferring from a first metal to a second metal through a wire changing layer.

However, in the working process of the display panel, the electrochemical reaction is easy to occur on the wire changing layer on the low-level voltage signal line, which corrodes the wire changing layer, leading to the failure of the wire changing layer and having the risk of open circuit.

SUMMARY

The present disclosure provides an array substrate, a liquid crystal display panel and a display device, which reduces the electrochemical reaction occurring on a first wire changing layer and reduces the risk of open circuit caused by the corrosion of the first wire changing layer.

In a first aspect, embodiments of the present disclosure provide an array substrate. The array substrate includes a display area and a frame area, a substrate, multiple signal lines, multiple connection lines, a first wire changing layer and at least one protection line. The frame area is located at a periphery of the display area and includes a wiring area. At least part of the multiple signal lines are located in the display area, and the multiple signal lines extends in a first direction and are arranged in a second direction. The first direction intersects the second direction. At least part of the multiple connection lines are located in the wiring area, and the multiple connection lines include a first connection line, and the first connection line is located on a side of the signal line facing away from the substrate. The first wire changing layer is located between the display area and the wiring area, and is located on a side of both the signal line and the connection line facing away from the substrate, the first wire changing layer is electrically connected to the signal line through a first via hole and is electrically connected to the first connection line through a second via hole. In the first direction, the at least one protection line is located between the wiring area and the display area, and the at least one protection line is in a same layer as the first wire changing layer; a voltage value applied to the signal line is a first voltage, a voltage value applied to the at least one protection line is a second voltage, and the first voltage is greater than or equal to the second voltage.

In a second aspect, the embodiment of the present disclosure provides a liquid crystal display panel. The liquid crystal display panel includes an array substrate, a liquid crystal layer and a counter substrate described in the first aspect. The liquid crystal layer is located between the array substrate and the counter substrate.

In a third aspect, embodiments of the present disclosure provide a display device. The display device includes the liquid crystal display panel described in the second aspect.

DETAILED DESCRIPTION

Figure 1:
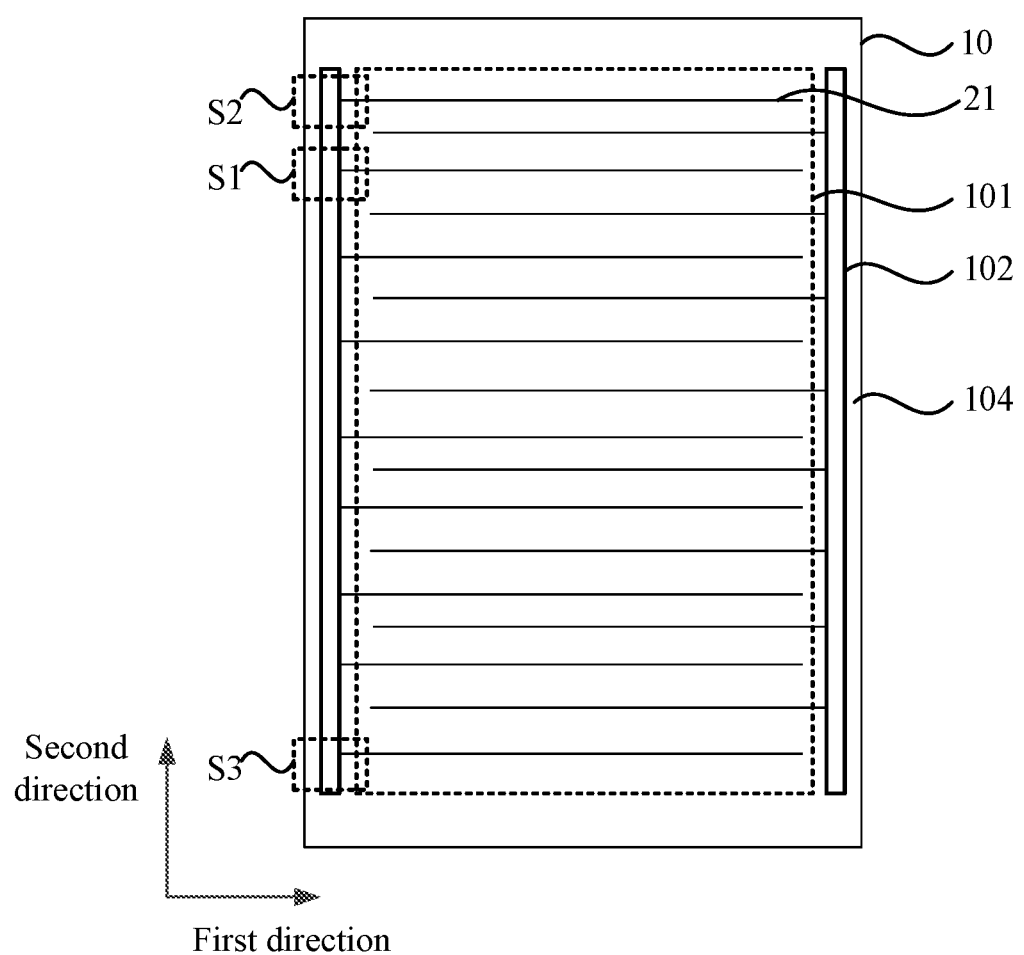
FIG. 1 is a structural diagram of an array substrate according to an embodiment of the present disclosure.

The present disclosure is further described hereinafter in detail in conjunction with drawings and embodiments. It is to be understood that embodiments described hereinafter are intended to explain the present disclosure and not to limit the present disclosure. Additionally, it is to be noted that for ease of description, only part, not all, of structures related to the present disclosure are illustrated in the drawings.

Figure 2:
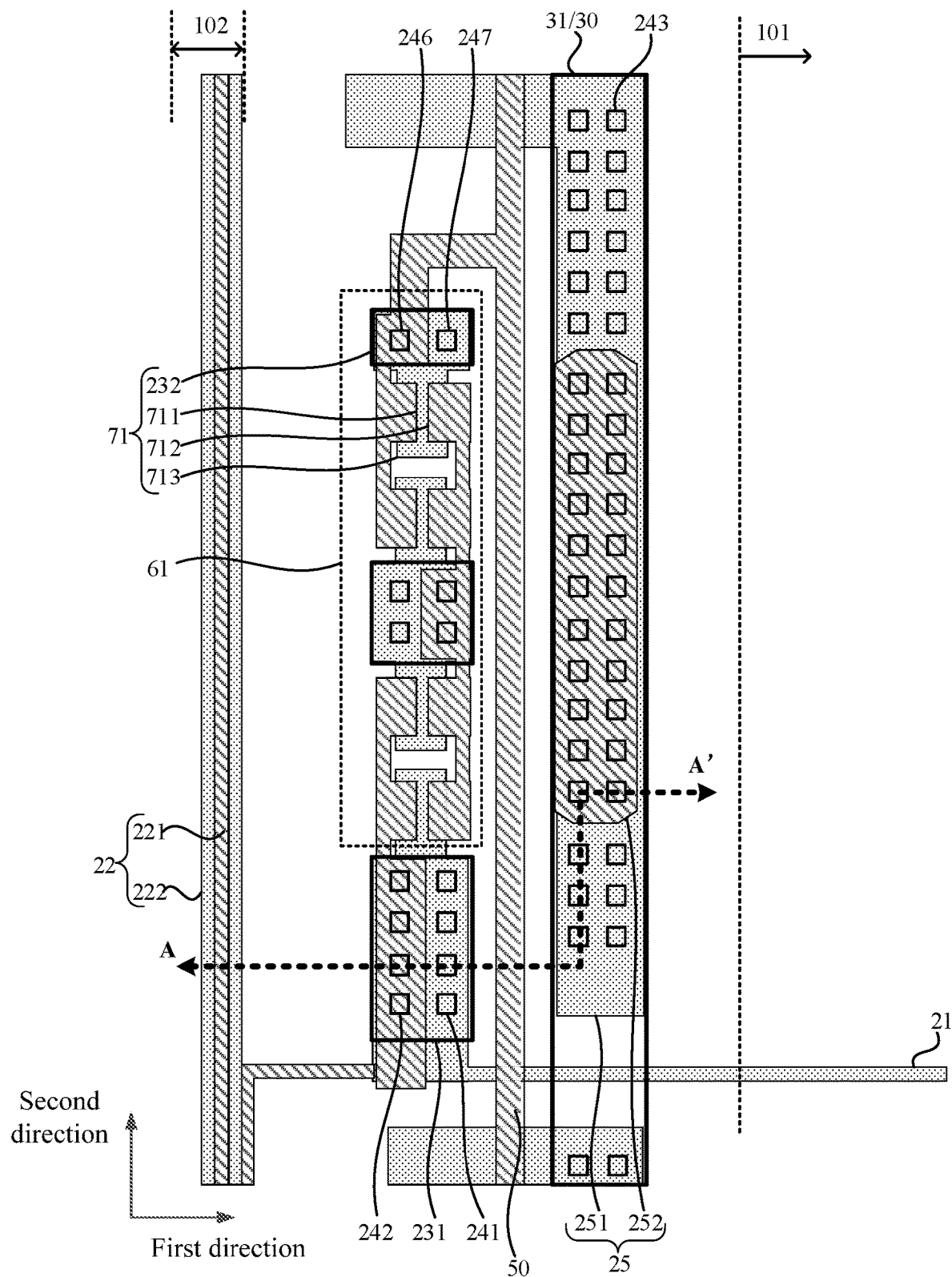
FIG. 2 is an enlarged diagram of an area S1 of FIG. 1.
Figure 3:
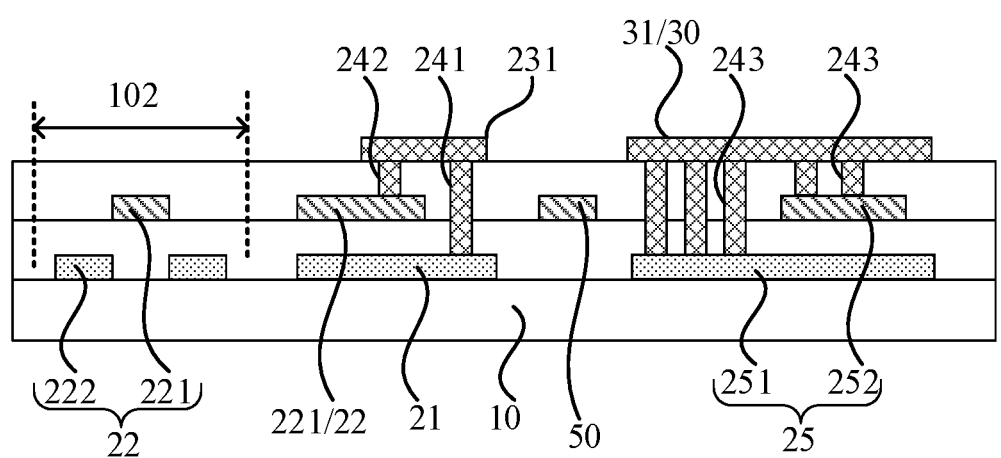
FIG. 3 is a sectional view taken along a section line AN of FIG. 2.

FIG. 1 is a structural diagram of an array substrate according to an embodiment of the present disclosure. FIG. 2 is an enlarged diagram of an area S1 of FIG. 1. FIG. 3 is a sectional view taken along a section line AA' of FIG. 2. Referring to FIGS. 1, 2 and 3, the display panel includes a display area 101 and a frame area 104. The frame area 104 is located at a periphery of the display area 101, and the frame area 104 includes a wiring area 102. The array substrate includes a substrate 10, multiple signal lines 21, multiple connection lines 22, a first wire changing layer 231, and at least one protection line 30. At least part of the multiple signal lines 21 are located in the display area 101, and the multiple signal lines 21 extend in a first direction and are arranged in a second direction. The signal lines 21 may extend from the display area 101 to the frame area 104. The first direction intersects the second direction, and in one embodiment, the first direction and the second direction may be perpendicular to each other. In another embodiment, the first direction and the second direction may not be perpendicular to each other and have an included angle greater than 0° and less than 90°. At least part of the multiple connection lines 22 are located in the wiring area 102, and the multiple connection lines 22 may extend from the wiring area 102 to an area which is within the frame area 104 and outside the wiring area 102. The multiple connection lines 22 include a first connection line 221, and at least one of the multiple connection lines 22 is the first connection line 221. The first connection line 221 is located on a side of the signal line 21 facing away from the substrate 10. A metal film layer where the signal line 21 is located is located between a metal film layer where the first connection line 221 is located and the substrate 10. The first wire changing layer 231 is located between the display area 101 and the wiring area 102. The first wire changing layer 231 is located on a side of the signal line 21 and the connection line 22 facing away from the substrate 10. The metal film layer where the first connection line 221 is located is located between a film layer where the first wire changing layer 231 is located and the substrate 10. The first wire changing layer 231 is electrically connected to the signal line 21 through a first via hole 241, and the first wire changing layer 231 is electrically connected to the first connection line 221 through a second via hole 242. In the first direction, at least one protection line 30 is located between the wiring area 102 and the display area 101. The at least one protection line 30 is in a same layer as the first wire changing layer 231. The at least one protection line 30 and the first wire changing layer 231 may be formed by a same material and in a same process. A voltage value applied to the signal line 21 is a first voltage, a voltage value applied to the at least one protection line 30 is a second voltage, and the first voltage is greater than or equal to the second voltage. It is to be noted that the first voltage applied to the signal line 21 may include an effective level and an ineffective level applied to the signal line 21, the second voltage is less than or equal to the effective level applied to the signal line 21, and the second voltage is less than or equal to the ineffective level applied to the signal line 21.

Embodiments of the present disclosure provide an array substrate. A first wire changing layer 231 is electrically connected to a signal line 21 through a first via hole 241 and is electrically connected to the first connection line 231 through a second via hole 242, thus the first connection line 221 is electrically connected to the signal line 21 in a manner of wire changing by the first wire changing layer 231. In the embodiment of the present disclosure, the at least one protection line 30 is arranged in a same layer as the first wire changing layer 231, the at least one protection line 30 is arranged between the wiring area 102 and the display area 101, and a voltage applied to the protection line 30 is same as a voltage applied to the signal line 21, or the voltage applied to the protection line 30 is lower than the voltage applied to the signal line 21 so that the electrochemical reaction preferentially occurs on the protection line 30 during the working process of the liquid crystal display panel, the electrochemical reaction occurring on the first wire changing layer 231 is weakened, and the risk of open circuit caused by the corrosion of the first wire changing layer 231 is reduced.

In an embodiment, referring to FIGS. 2 and 3, the multiple connection lines 22 also include a second connection line 222. The second connection line 222 is in a same layer as the signal line 21. The first connection line 221 and the second connection line 222 are in different layers so that a frame occupied by the first connection line 221 arranged in a single film layer is relatively small, and a frame occupied by the second connection line 222 arranged in a single film layer is relatively small, thus implementing the narrow bezel of the array substrate. Since the first connection line 221 and the signal line 21 are located in different metal film layers, the first wire changing layer 231 is arranged to realize the electrical connection between the first connection line 221 and the signal line 21. The first wire changing layer 231 may include a metal oxide, and a low-level signal (e.g., −10 V to −7 V) exists on the signal line 21 during the working operation of the display panel. For example, the first wire changing layer 231 includes the metal oxide. The metal oxide includes an indium tin oxide, and trivalent indium on the first wire changing layer 231 at a low level is reduced to elemental indium, so that the first wire changing layer 231 is easy to be corroded, having a risk of short circuit. The protection line 30 exists in the array substrate provided by the embodiments of the present disclosure, the protection line 30 with a lower voltage is more easily to be corroded than the first wire changing layer 231, and the corrosion position is transferred from the first wire changing layer 231 to the protection line 30, the electrochemical reaction occurred on the first wire changing layer 231 is weakened.

In an embodiment, referring to FIGS. 2 and 3, the signal line 21 may be a scanning line for providing a scanning control signal. It is also to be noted that a drive circuit of the signal line 21 may use a single driver chip, or a gate driving circuit may be integrated into the array substrate. As shown in FIG. 1, the wiring area 102 may be arranged on both two opposite sides of the display area 101 to implement a bilateral driving of the signal line 21. In other embodiments, the wiring area 102 may be merely arranged on one side of the display area 101 to implement a unilateral driving of the signal line 21.

Figure 4:
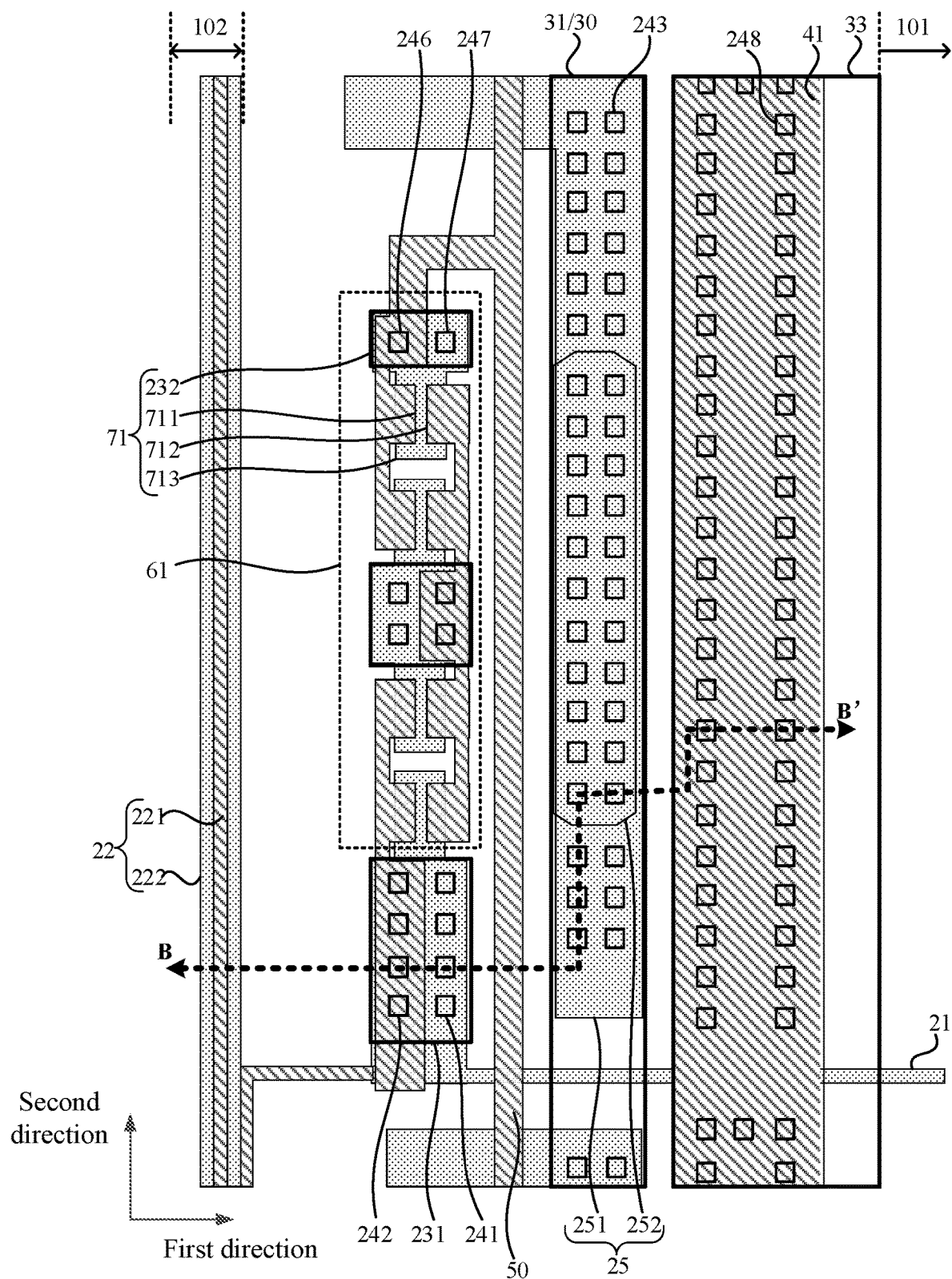
FIG. 4 is a structural diagram of another array substrate according to an embodiment of the present disclosure.
Figure 5:
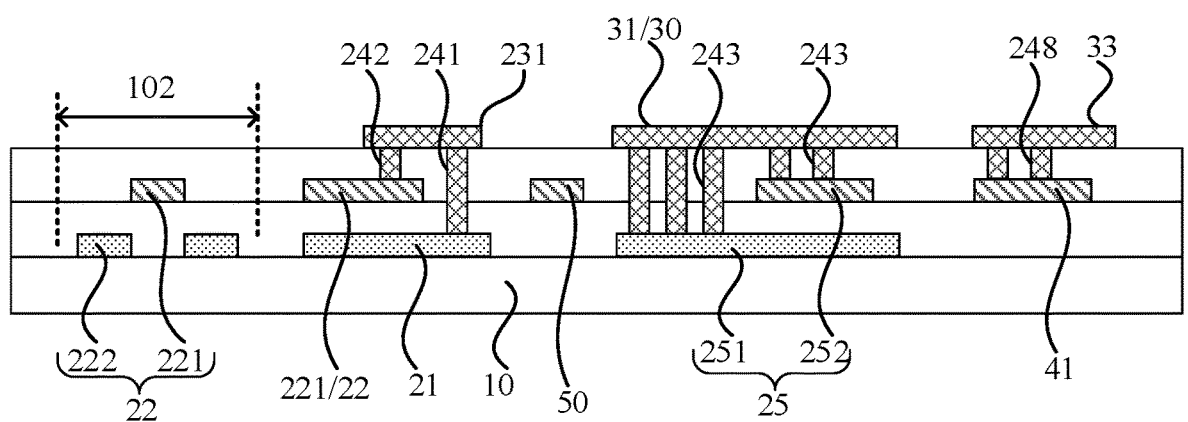
FIG. 5 is a sectional view taken along a section line BB' of FIG. 4.

FIG. 4 is a structural diagram of another array substrate according to an embodiment of the present disclosure. FIG. 5 is a sectional view taken along a section line BB' of FIG. 4. Referring to FIGS. 4 and 5, the array substrate further includes a first common electrode line 41. In a first direction, the first common electrode line 41 is located between a first wire changing layer 231 and a display area 101.

In an embodiment, referring to FIGS. 4 and 5, the first common electrode line 41 is in a same layer as a first connection line 221, a display wire changing layer 33 is in a same layer as the first wire changing layer 231, and the first common electrode line 41 is electrically connected to the display wire changing layer 33 through an eighth via hole 248. The display wire changing layer 33 is used for connecting the first common electrode line 41 and the film layer in the display area 101, for example, a common electrode layer in the display area 101 is electrically connected to the first common electrode line 41 through the display wire changing layer 33. In one embodiment, the common electrode layer in the display area 101 and the display wire changing layer 33 which are in a same layer may be electrically connected. In another embodiment, the common electrode layer in the display area 101 and the display wire changing layer 33 which are in different layers may be electrically connected.

Based on the above embodiments, referring to FIGS. 4 and 5, at least one protection line 30 includes a first protection line 31. In the first direction, the first protection line 31 is located between the first wire changing layer 231 and the first common electrode line 41. In the embodiment of the present disclosure, the first protection line 31 is located between the first wire changing layer 231 and the first common electrode line 41, and a distance between the first protection line 31 and the first common electrode line 41 is smaller than a distance between the first wire changing layer 231 and the first common electrode line 41. Compared with the first wire changing layer 231, an electrolytic cell is more easily to be formed between the first protection line 31 and the first common electrode line 41. The distance between the first protection line 31 and the first common electrode line 41 refers to a vertical distance between a side of the first protection line 31 adjacent to the first common electrode line 41 and a side of the first common electrode line 41 adjacent to the first protection line 31 in the first direction. The distance between the first protection line 231 and the first common electrode line 41 refers to a vertical distance between a side of the first protection line 231 adjacent to the first common electrode line 41 and a side of the first common electrode line 41 adjacent to the first protection line 31 in the first direction. The distance between two devices in various embodiments of the present disclosure may be a vertical distance between edges of adjacent sides of the two devices. The first common electrode line 41 serves as an anode of the electrolytic cell, and the first protection line 31 serves as a cathode of the electrolytic cell, so that an electrochemical reaction preferentially occurs on the first protection line 31, which weakens the electrochemical reaction occurring on the first wire changing layer 231 and reduces the risk of open circuit caused by the corrosion of the first wire changing layer 231.

Figure 6:
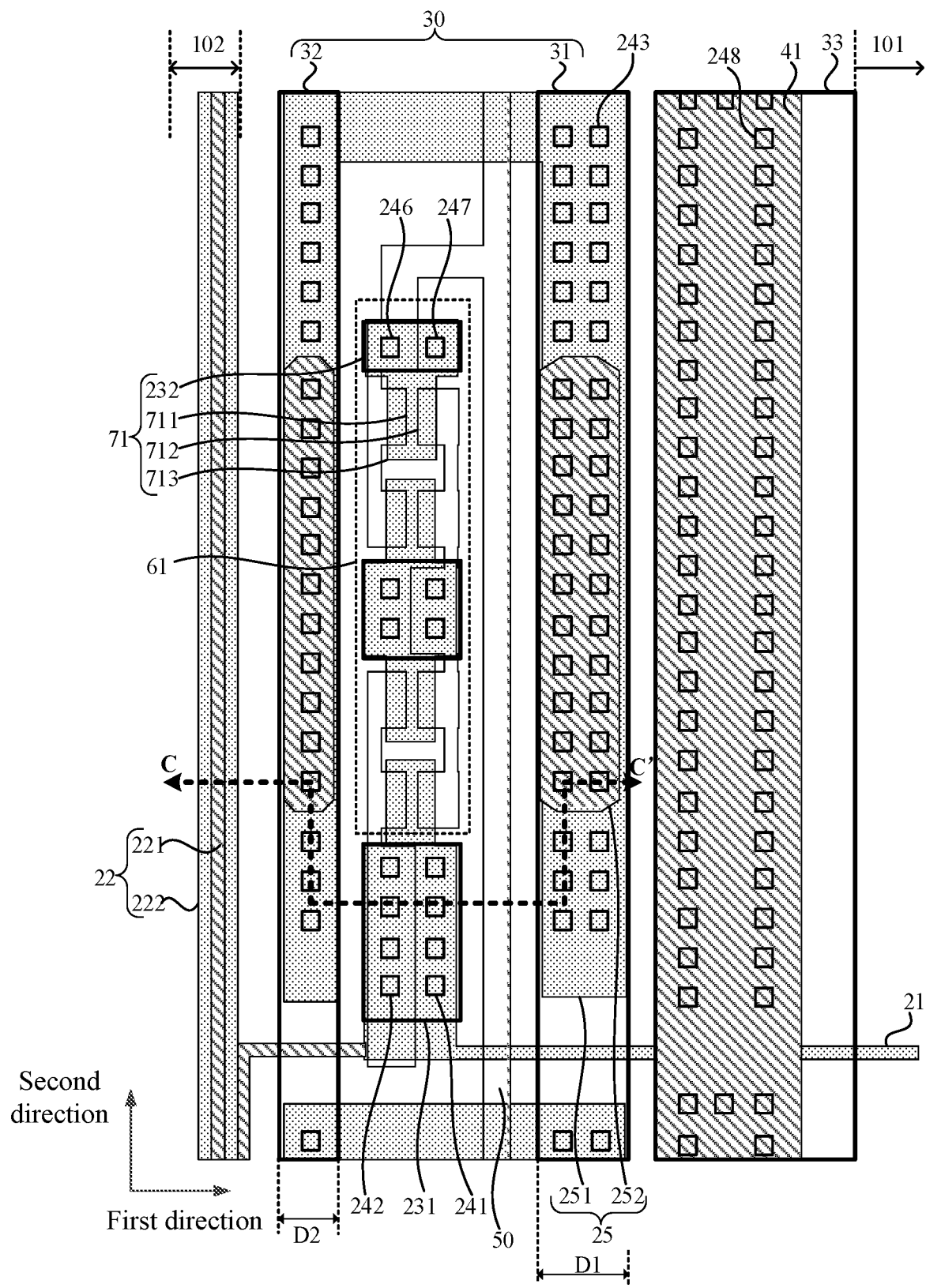
FIG. 6 is a structural diagram of another array substrate according to an embodiment of the present disclosure.
Figure 7:
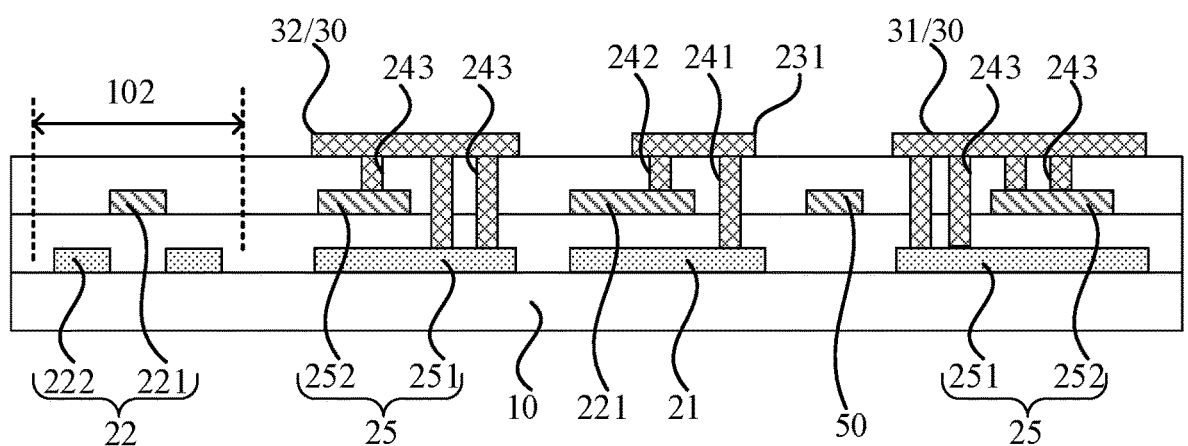
FIG. 7 is a sectional view taken along a section line CC' of FIG. 6.

FIG. 6 is a structural diagram of another array substrate according to an embodiment of the present disclosure. FIG. 7 is a sectional view taken along a section line CC' of FIG. 6. Referring to FIGS. 6 and 7, the at least one protection line 30 also includes a second protection line 32. The array substrate includes two protection lines 30, which are a first protection line 31 and the second protection line 32 separately. In a first direction, the second protection line 32 is located between a first wire changing layer 231 and a wiring area 102. In the embodiment of the present disclosure, the array substrate includes the first protection line 31 and the second protection line 32. An electrolytic cell is formed between the first protection line 31 and the first common electrode line 41. A voltage on the second protection line 32 is less than or equal to a voltage on the first wire changing layer 231. The protection line 30 having a lower voltage is more easily to be corroded than the first wire changing layer 231. The electrolytic cell is formed between the second protection line 32 and the first common electrode line 41, and the electrochemical reaction preferentially occurs on the first protection line 31 and the second protection line 32, so that the corrosion position is transferred from the first wire changing layer 231 to the first protection line 31 and the second protection line 32, and the electrochemical reaction occurring on the first wire changing layer 231 is weakened. In the first direction, the first wire changing layer 231 is located between the first protection line 31 and the second protection line 32, and the first protection line 31 and the second protection line 32 surround the first wire changing layer 231, further weakening the electrochemical reaction occurring on the first wire changing layer 231.

In an embodiment, referring to FIG. 6, in the first direction, a width of the first protection line 31 is D1, and a width of the second protection line 32 is D2. D1 is greater than D2. In the embodiment of the present disclosure, in the first direction, a distance between the first protection line 31 and the first common electrode line 41 is smaller than a distance between the second protection line 32 and the first common electrode line 41. The first protection line 31 is more easily to be corroded by the second protection line 32. A corrosion degree of the first protection line 31 is greater than a corrosion degree of the second protection line 32. To prevent the first protection line 31 from being broken by the corrosion and to enable the first protection line 31 to protect the first wire changing layer 231, the embodiments of the present disclosure further arrange the width of the first protection line 31 to be larger than the width of the second protection line 32, thereby arranging a larger width for the first protection line 31 which is easier to be corroded and enhancing the corrosion resistance of the first protection line 31.

Figure 8:
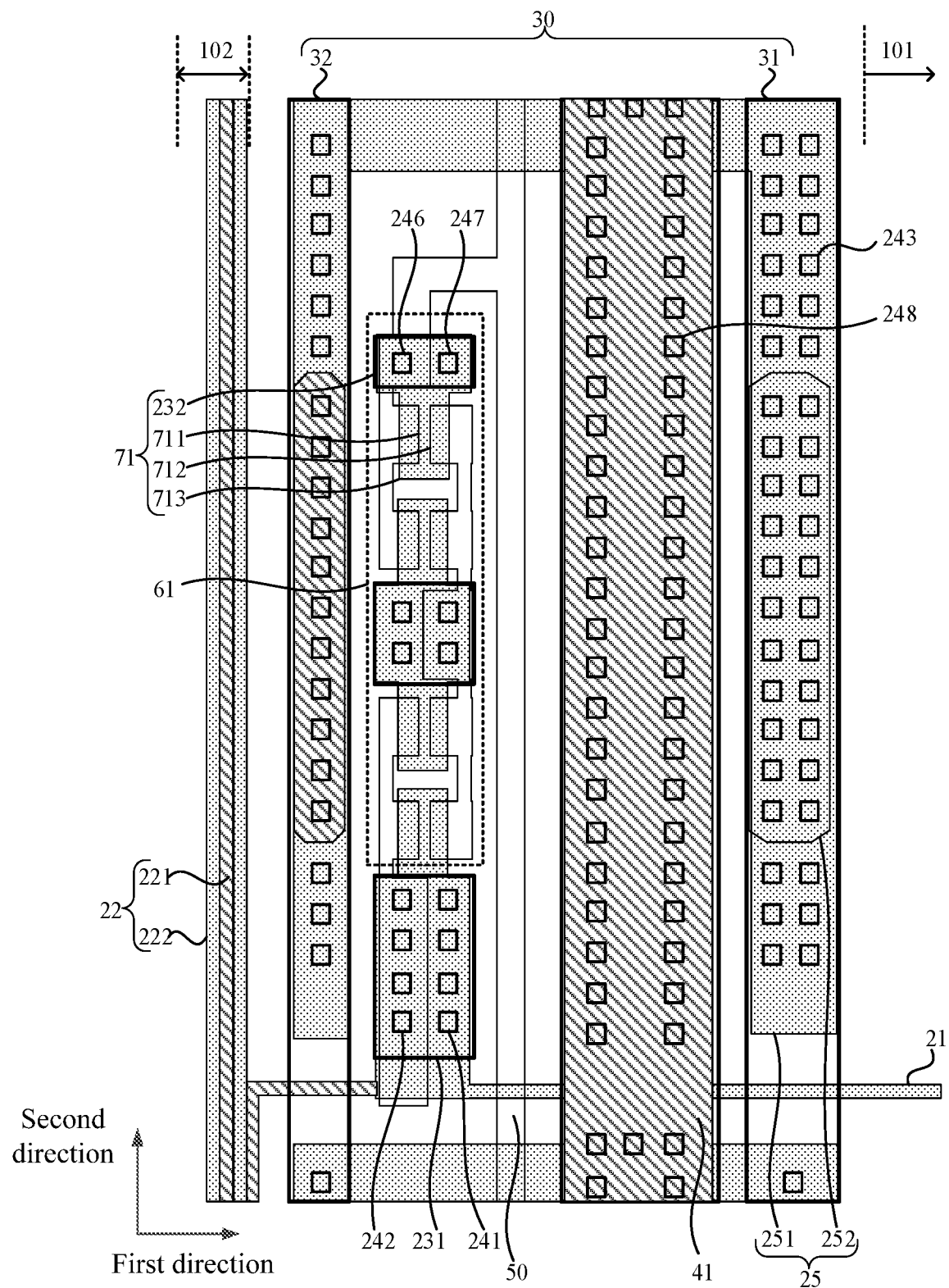
FIG. 8 is a structural diagram of another array substrate according to an embodiment of the present disclosure.

FIG. 8 is a structural diagram of another array substrate according to an embodiment of the present disclosure. Referring to FIG. 8, the array substrate further includes a first common electrode line 41. In the first direction, the first common electrode line 41 is located between a first wire changing layer 231 and a display area 101. At least one protection line 30 includes a first protection line 31. In the first direction, the first protection line 31 is located between the first common electrode line 41 and the display area 101. In the embodiment of the present disclosure, the first protection line 31 is located on a side of the first wire changing layer 231 facing away from the first common electrode line 41, and the electrochemical reaction preferentially occurs on the first protection line 31, so that the corrosion position is transferred from the first wire changing layer 231 to the first protection line 31, the electrochemical reaction occurring on the first wire changing layer 231 is weakened, and the risk of open circuit caused by the corrosion of the first wire changing layer 231 is reduced. Furthermore, a distance between the first protection line 31 and the first common electrode line 41 may be smaller than a distance between the first wire changing layer 231 and the first common electrode line 41, thereby reducing the distance between the first protection line 31 and the first common electrode line 41, making the corrosion more likely to occur on the first protection line 31, and enhancing the protection ability of the first protection line 31 to the first wire changing layer 231.

In an embodiment, referring to FIGS. 6 and 7, the array substrate also includes at least one auxiliary line 25. In a direction perpendicular to the substrate 10, the auxiliary line 25 overlaps the protection line 30, and the auxiliary line 25 and the protection line 30 are electrically connected through a third via hole 243. In the embodiment of the present disclosure, the auxiliary line 25 and the protection line 30 are overlapped and electrically connected through the third via hole 243. The auxiliary line 25 is connected in parallel with the protection line 30, and a resistance after the auxiliary line 25 is connected in parallel with the protection line 30 is smaller than a resistance of the protection line 30, thereby reducing the loss of electrical signals on the protection line 30 and keeping the protection line 30 in a low voltage state at various positions.

In an embodiment, referring to FIGS. 6 and 7, at least one auxiliary line 25 includes a first auxiliary line 251 which is in a same layer as the signal line 21. In the embodiment of the present disclosure, the first auxiliary line 251 and the signal line 21 are in the same layer, and the first auxiliary line 251 and the signal line 21 may be formed by a same material and in a same process, thus saving the process. The first auxiliary line 251 and the protection line 30 are overlapped and electrically connected through the third via hole 243. The auxiliary line 251 is connected in parallel with the protection line 30, and a resistance after the auxiliary line 251 is connected in parallel with the protection line 30 is smaller than a resistance of the protection line 30, thereby reducing the loss of electrical signals on the protection line 30 and keeping each position of the protection line 30 in a low voltage state, so that each position of the protection line 30 is in the low voltage state.

In an embodiment, referring to FIGS. 6 and 7, at least one auxiliary line 25 includes a second auxiliary line 252 which is in a same layer as the first connection line 221. In the embodiment of the present disclosure, the second auxiliary line 252 and the first connection line 221 are in a same layer, and the second auxiliary line 252 and the first connection line 221 may be formed by a same material and in a same process, thus saving the process. The second auxiliary line 252 and the protection line 30 are overlapped and electrically connected through the third via hole 243. The second auxiliary line 252 is connected in parallel with the protection line 30, and a resistance after the second auxiliary line 252 is connected in parallel with the protection line 30 is smaller than a resistance of the protection line 30, thereby reducing the loss of electrical signals on the protection line 30 and keeping each position of the protection line 30 in a low voltage state, so that each position of the protection line 30 is in the low voltage state.

In an embodiment, referring to FIGS. 6 and 7, both the first wire changing layer 231 and the protection line 30 include a metal oxide. In the embodiment of the present disclosure, both the first wire changing layer 231 and the protection line 30 include the metal oxide. During the working operation of the display panel, a reduction reaction occurs on the protection line 30 at a low level to reduce the metal oxides into simple substances. For example, the metal oxide includes an indium tin oxide, trivalent indium on the protection line 30 at the low level is reduced to elemental indium, so that the protection line 30 with a lower voltage is more easily to be corroded than the first wire changing layer 231, the corrosion position is transferred from the first wire changing layer 231 to the first protection line 31 and the second protection line 32, the electrochemical reaction occurring on the first wire changing layer 231 is weakened.

Figure 9:
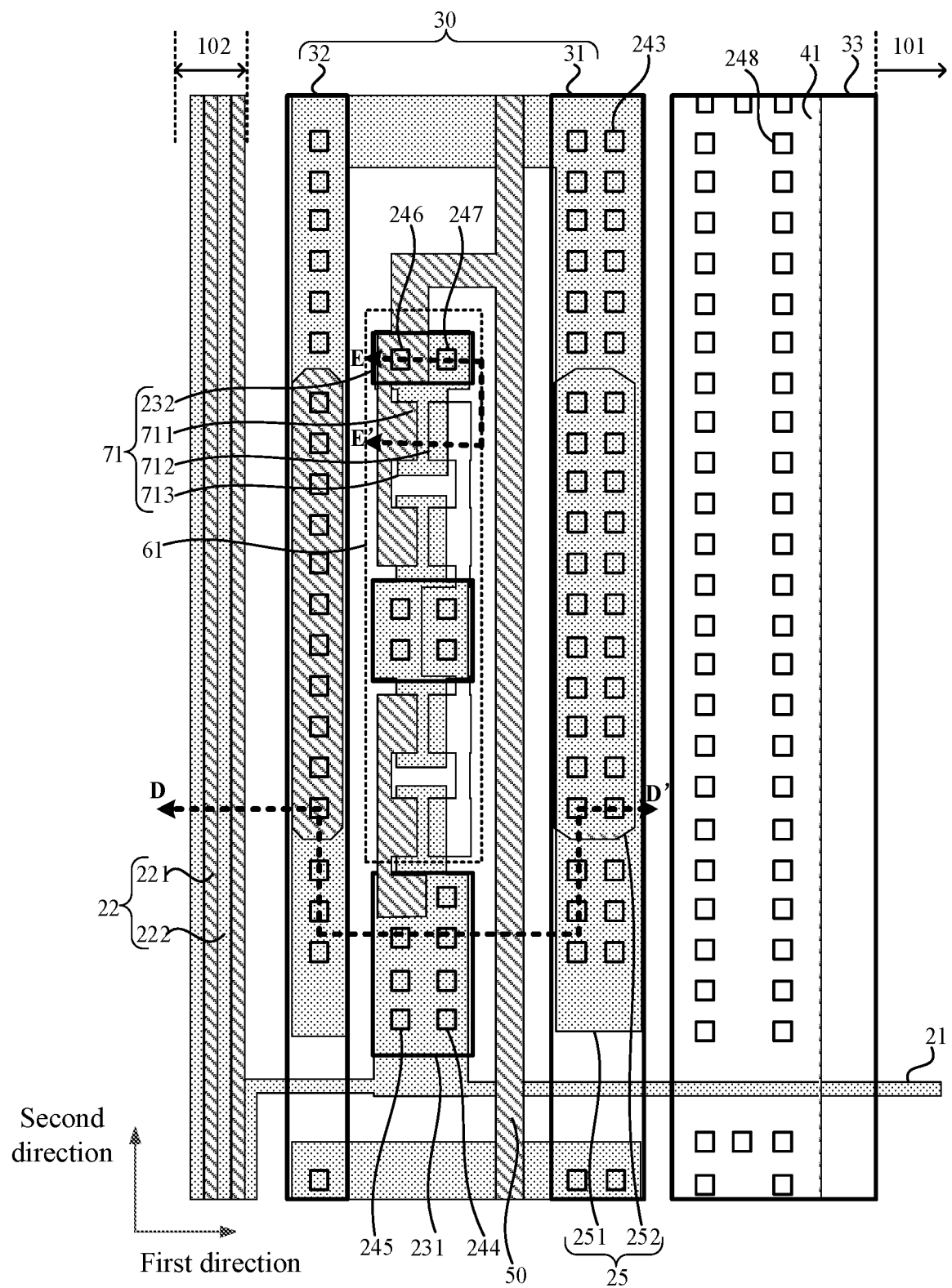
FIG. 9 is a structural diagram of another array substrate according to an embodiment of the present disclosure.
Figure 10:
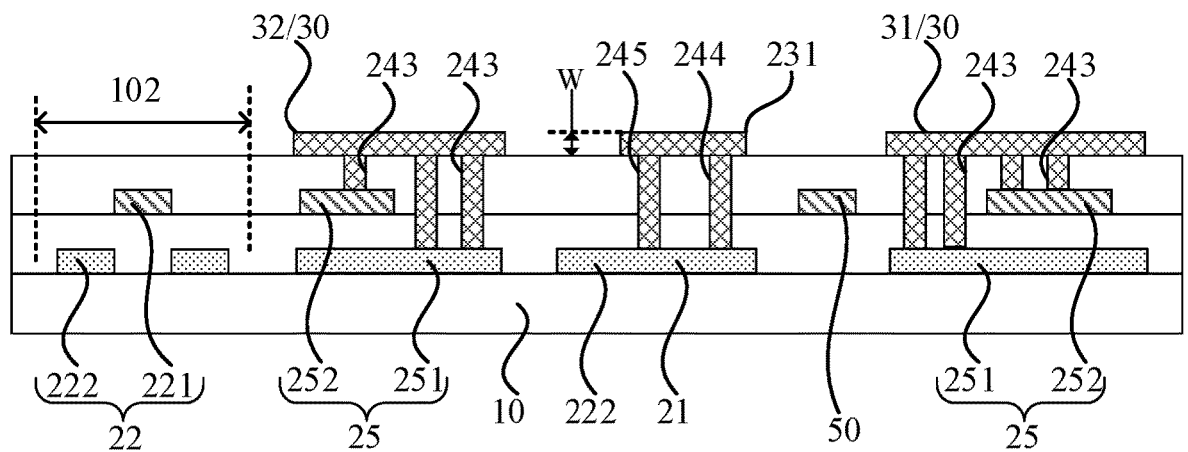
FIG. 10 is a sectional view taken along a section line DD' of FIG. 9.

FIG. 9 is a structural diagram of another array substrate according to an embodiment of the present disclosure. FIG. 10 is a sectional view taken along a section line DD' of FIG. 9. Based on the above embodiment, referring to FIGS. 9 and 10, multiple connection lines 22 also include second connection lines 222, which are in a same layer as a signal line 21. The second connection lines 222 are in a different layer with the first connection line 221, and a metal film layer where the second connection lines 222 are located is located between a metal film layer where the first connection line 221 is located and the substrate 10, so as to reduce a width of a wiring area 102 and a frame of the array substrate with respect to the single-layer wiring. The first wire changing layer 231 is electrically connected to the signal line 21 through a fourth via hole 244, and the first wire changing layer 231 is electrically connected to the second connection line 222 through a fifth via hole 245. Since the first connection line 221 is electrically connected to the signal line 21 through the first wire changing layer 231, in the embodiment of the present disclosure, the second connection line 222 and the signal line 21 are also electrically connected through the first wire changing layer 231, so that both the first connection line 221 and the second connection line 222 are electrically connected through the first wire changing layer 231, and the signal lines 21 electrically connected to the first connection line 221 and the second connection line 222 have a same load, thereby balancing the load on each signal line 21. In other embodiments, the second connection line 222 and the signal line 21 which are in the same layer may also be directly electrically connected.

Figure 11:
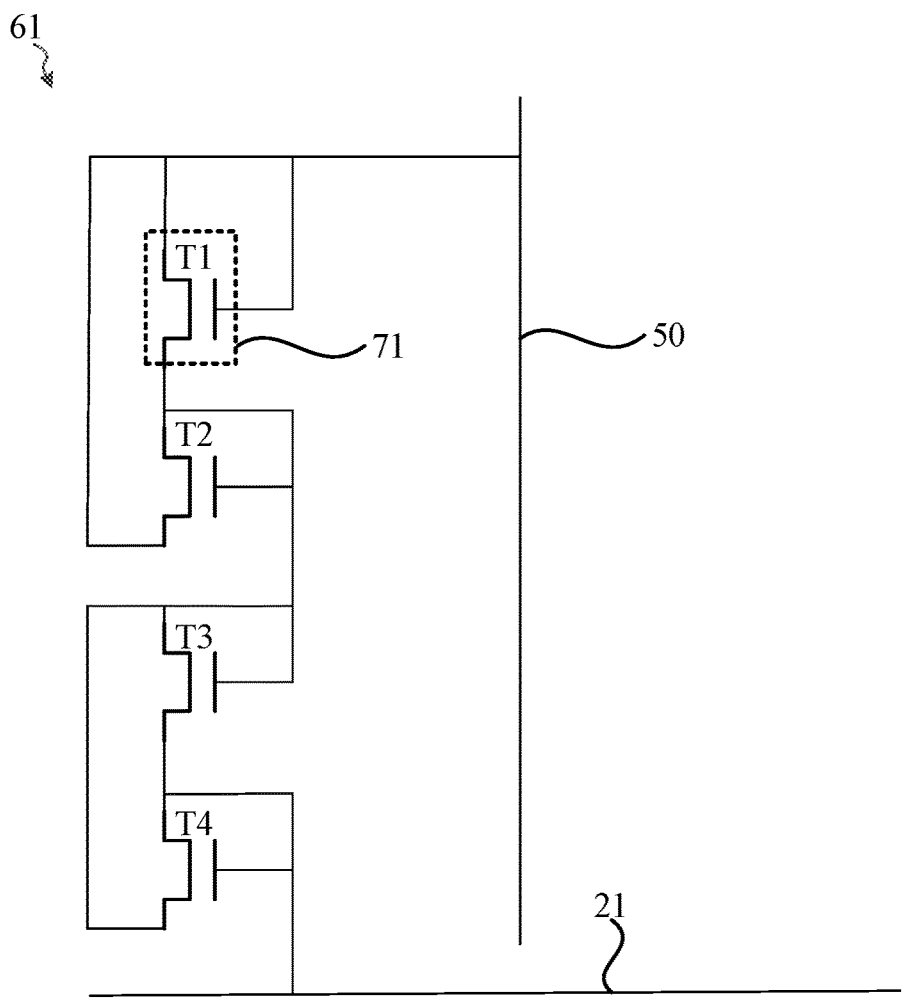
FIG. 11 is a circuit diagram of a first electrostatic discharge circuit according to an embodiment of the present disclosure.
Figure 12:
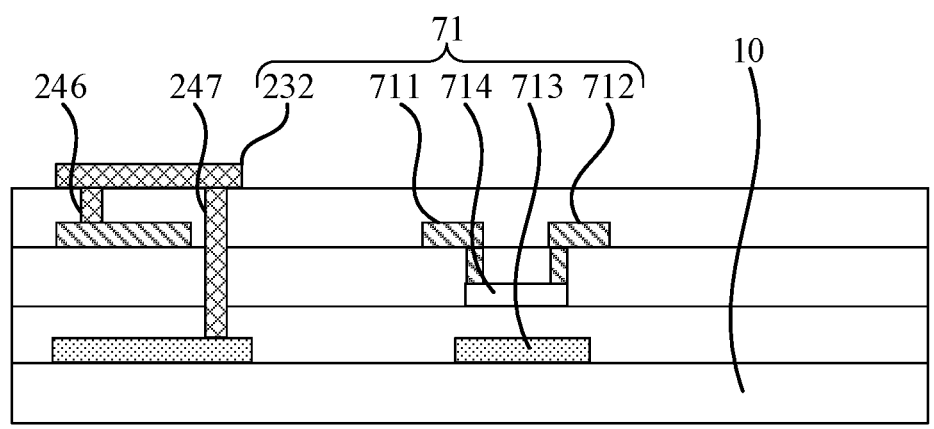
FIG. 12 is a sectional view taken along a section line EE' of FIG. 9.

FIG. 11 is a circuit diagram of a first electrostatic discharge circuit according to an embodiment of the present disclosure. FIG. 12 is a sectional view taken along a section line EE' of FIG. 9. Referring to FIGS. 9, 11 and 12, the array substrate further includes a first common electrode line 41, an electrostatic discharge line 50, and multiple first electrostatic discharge circuits 61 (FIG. 9 illustrates one first electrostatic discharge circuit 61 as an example). In the first direction, the first common electrode line 41 is located between a first wire changing layer 231 and a display area 101. The electrostatic discharge line 50 and the multiple first electrostatic discharge circuits 61 are both located between the first common electrode line 41 and the wiring area 102. A first end of each of the multiple first electrostatic discharge circuits 61 is electrically connected to the signal line 21. In an embodiment, the first end of the first electrostatic discharge circuit 61 may be electrically connected to a part of the signal line 21 extending to a frame area 104. A second end of the first electrostatic discharge circuit 61 is electrically connected to the electrostatic discharge line 50. The first electrostatic discharge circuit 61 may conduct the static electricity on the signal line 21 to the electrostatic discharge line 50 to prevent the static electricity accumulation on the signal line 21. The first electrostatic discharge circuit 61 includes multiple first thin film transistors 71. Each of the multiple first thin film transistors 71 includes a gate 713, a first electrode 711, a second electrode 712 and a second wire changing layer 232. The second wire changing layer 232 is electrically connected to the first electrode 711 of the first thin film transistor 71 through a sixth via hole 246 and is electrically connected to the gate 713 of the first thin film transistor 71 through a seventh via hole 247. The first electrode 711 of the first thin film transistor 71 is electrically connected to the gate 713 of the first thin film transistor 71 through the second wire changing layer 232. The first wire changing layer 231 is in a same layer as the second wire changing layer 232, and the first wire changing layer 231, the first thin film transistor 71, and the second wire changing layer 232 are arranged in a second direction. In the embodiment of the present disclosure, each signal line 21 is correspondingly provided with one first electrostatic discharge circuit 61, and the first electrostatic discharge circuit 61 includes the second wire changing layer 232. The protection line 30 not only protects the first wire changing layer 231. The corrosion position is transferred from the first wire changing layer 231 to the protection line 30. The protection line 30 also protects the second wire changing layer 232 in the first electrostatic discharge circuit 61, transfers the corrosion position from the second wire changing layer 232 to the protection line 30, reduces the risk of open circuit caused by the corrosion of the first wire changing layer 231, and the risk of open circuit caused by the corrosion of the second wire changing layer 232 in the first electrostatic discharge circuit 61. In addition, the first wire changing layer 231, the first thin film transistor 71, and the second wire changing layer 232 are arranged in the second direction, and distances occupied by the first wire changing layer 231, the first thin film transistor 71, and the second wire changing layer 232 in the first direction are overlapped, thereby reducing the frame spacing in the first direction and implementing the narrow bezel of the array substrate.

In an embodiment, referring to FIG. 11, the first electrostatic discharge circuit 61 includes four first thin film transistors 71, which are a first sub-thin film transistor T1, a second sub-thin film transistor T2, a third sub-thin film transistor T3, and a fourth sub-thin film transistor T4 separately. A gate of the first sub-thin film transistor T1 is electrically connected to a first electrode of the first sub-thin film transistor T1, a gate of the second sub-thin film transistor T2 is electrically connected to a first electrode of the second sub-thin film transistor T2, a second electrode of the first sub-thin film transistor T1 is electrically connected to the first electrode of the second sub-thin film transistor T2, the first electrode of the first sub-thin film transistor T1 is electrically connected to a second electrode of the second sub-thin film transistor T2, and the first electrode of the first sub-thin film transistor T1 is electrically connected to the electrostatic discharge line 50. A gate of the third sub-thin film transistor T3 is electrically connected to a first electrode of the third sub-thin film transistor T3, a gate of the fourth sub-thin film transistor T4 is electrically connected to a first electrode of the fourth sub-thin film transistor T4, a second electrode of the third sub-thin film transistor T3 is electrically connected to the first electrode of the fourth sub-thin film transistor T4, the first electrode of the third sub-thin film transistor T3 is electrically connected to a second electrode of the fourth sub-thin film transistor T4, and a gate of the fourth sub-thin film transistor T4 is electrically connected to the signal line 21. The gate of the third sub-thin film transistor T3 is electrically connected to the gate of the second sub-thin film transistor T2.

Figure 13:
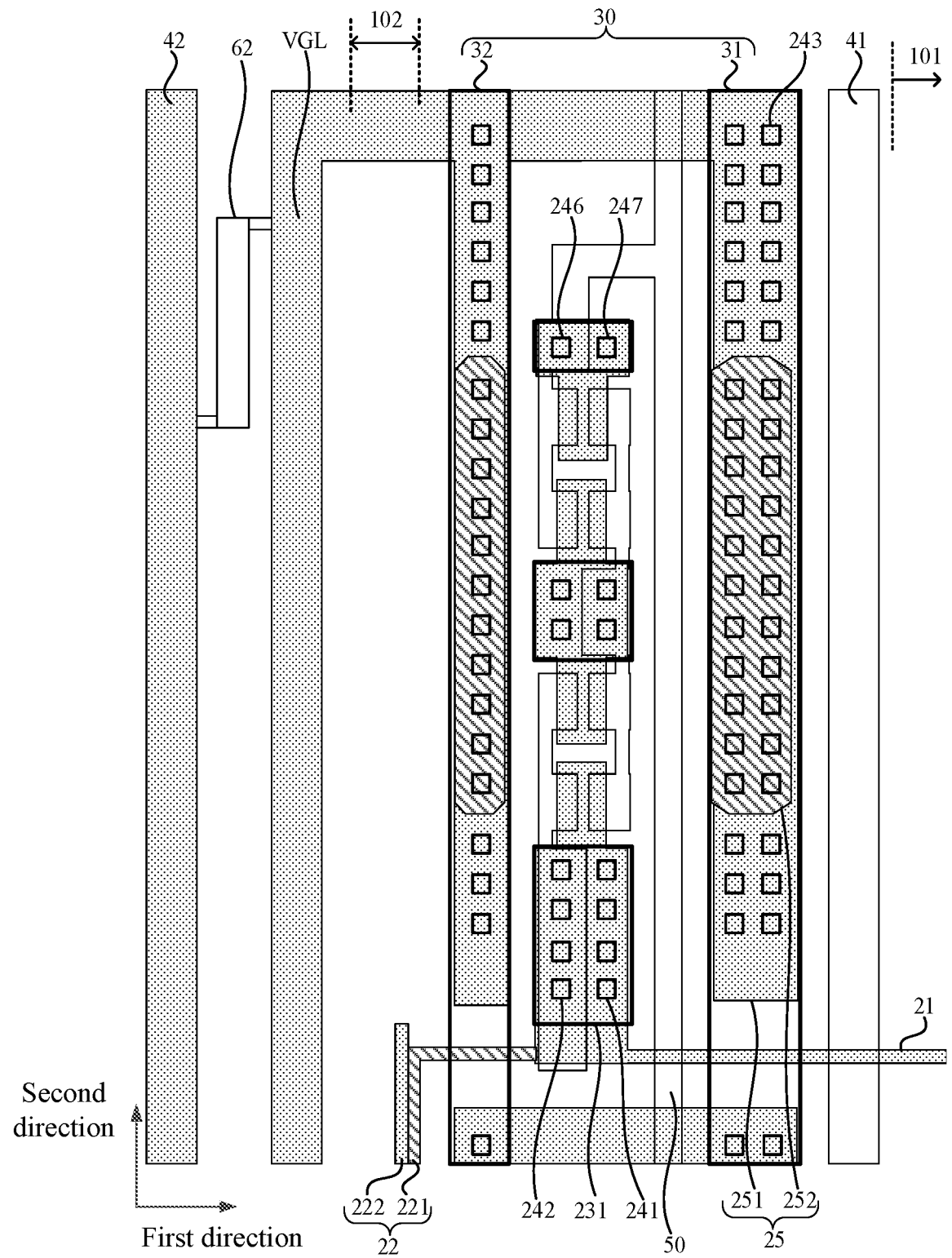
FIG. 13 is an enlarged view of an area S2 of FIG. 1.

FIG. 13 is an enlarged view of an area S2 of FIG. 1. Referring to FIGS. 1 and 13, the array substrate further includes a constant voltage low potential line VGL. The constant voltage low potential line VGL is located on a side of the wiring area 102 facing away from the display area 101, and the constant voltage low potential line VGL is electrically connected to the protection line 30. In the embodiment of the present disclosure, the array substrate further includes the constant voltage low potential line VGL, the constant voltage low potential line VGL is electrically connected to the protection line 30, and a second voltage is provided for the protection line 30 through the constant voltage low potential line VGL.

In an embodiment, referring to FIG. 13, the constant voltage low-potential line VGL, the first auxiliary line 251 and the signal line 21 are in a same layer, and the constant voltage low-potential line VGL, the first auxiliary line 251 and the signal line 21 may be formed by a same material and in a same process, saving the process. The constant voltage low potential line VGL and the first auxiliary line 251 are electrically connected in a same layer. The constant voltage low potential line VGL is electrically connected to the protection line 30 through the first auxiliary line 251, thereby providing a second voltage to the protection line 30.

Figure 14:
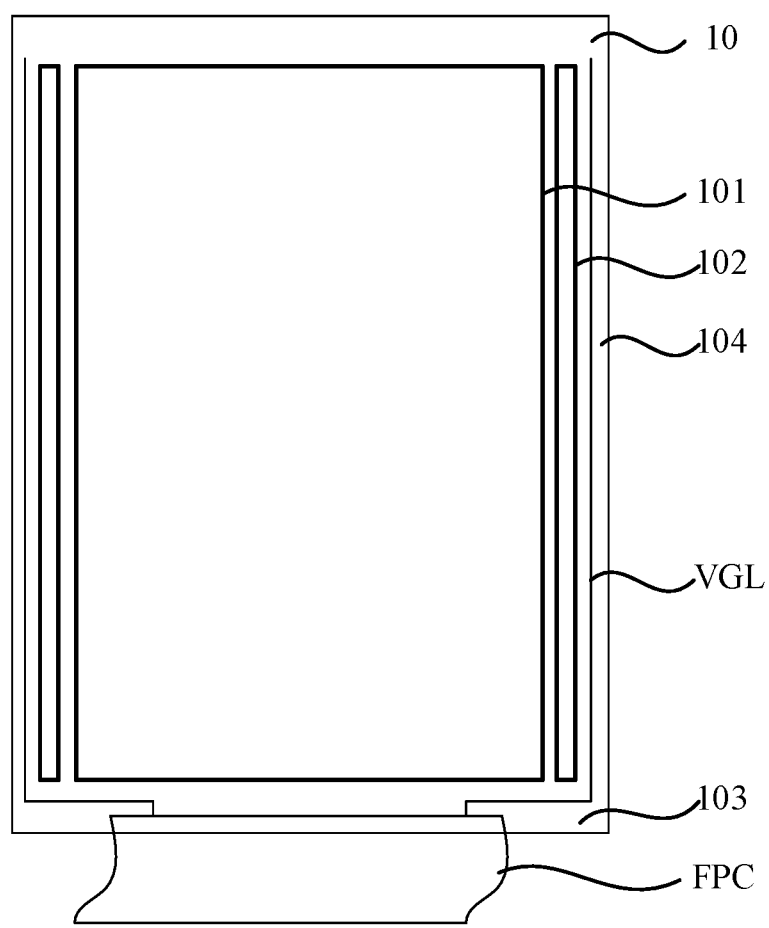
FIG. 14 is a structural diagram of another array substrate according to an embodiment of the present disclosure.

FIG. 14 is a structural diagram of another array substrate according to an embodiment of the present disclosure. Referring to FIG. 14, the array substrate further includes a step area 103. The step area 103 and a frame area 102 are located at two adjacent sides of a display area 101 respectively. In an embodiment, a wiring area 102 may be located on left and right sides of the array substrate and the step area 103 may be located on a lower side of the array substrate. The array substrate also includes a flexible circuit board FPC. The flexible circuit board FPC is bound to the step area 103, and the constant voltage low potential line VGL is electrically connected to the flexible circuit board FPC. In the embodiment of the present disclosure, a constant voltage low potential line VGL is electrically connected to a flexible circuit board FPC, that is, the constant voltage low potential line VGL is led out from the flexible circuit board FPC, and a pin on the flexible circuit board FPC provides a second voltage for the constant voltage low potential line VGL.

Figure 15:
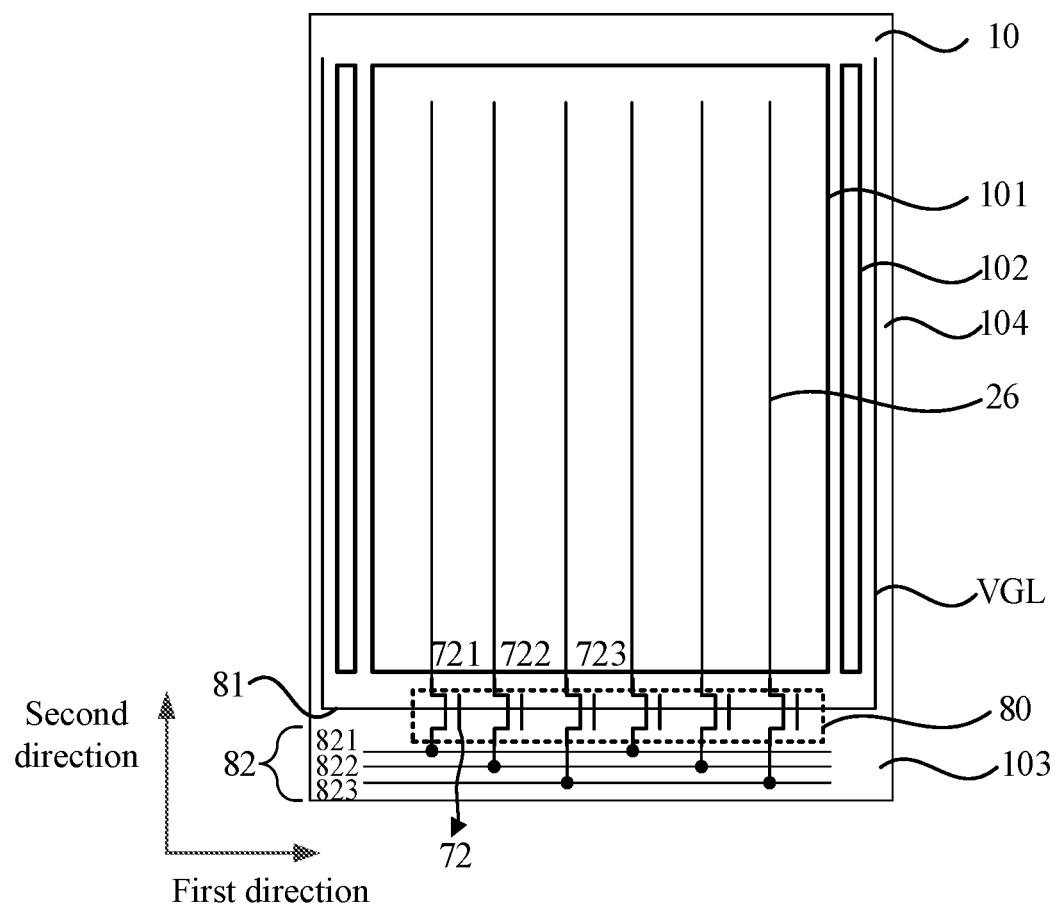
FIG. 15 is a structural diagram of another array substrate according to an embodiment of the present disclosure.

FIG. 15 is a structural diagram of another array substrate according to an embodiment of the present disclosure. Referring to FIG. 15, the array substrate further includes a step area 103. The step area 103 and a frame area 102 are located at two adjacent sides of the display area 101 respectively. The array substrate also includes a display test circuit 80 and multiple data lines 26. The multiple data lines 26 are located in the display area 101. The multiple data lines 26 extend in a second direction and are arranged in a first direction. The display test circuit 80 is located in the step area 103, and includes multiple second thin film transistors 72, multiple test signal lines 82, and at least one test control line 81. The second thin film transistor 72 includes a gate, a first electrode and a second electrode, the gate of the second thin film transistor 72 is electrically connected to the at least one test control line 81, the first electrode of the second thin film transistor 72 is electrically connected to the test signal lines 82, and the second electrode of the second thin film transistor 72 is electrically connected to the data lines 26. The constant voltage low potential line VGL is electrically connected to the at least one test control line 81. In the embodiment of the present disclosure, the array substrate further includes the display test circuit 80. During a VT test, the second thin film transistor 72 is turned on by applying a corresponding signal to the at least one test control line 81, and then test signals are provided for a corresponding data line 26 through a corresponding test control line 81, thereby performing the VT test. After the VT test, that is, during the normal use of the array substrate, the second thin film transistor 72 is turned off by applying a low-level signal to the at least one test control line 81. The constant voltage low potential line VGL is electrically connected to the at least one test control line 81, and the at least one test control line 81 provides a second voltage for the constant voltage low potential line VGL.

In an embodiment, referring to FIG. 15, multiple second thin film transistors 72 in the display test circuit 80 are a first switch transistor 721, a second switch transistor 722, and a third switch transistor 723 separately. The multiple test signal lines 82 include a first test signal line 821, a second test signal line 822, and a third test signal line 823. A first electrode of the first switch transistor 721 is electrically connected to the first test signal line 821, a first electrode of the second switch tube 722 is electrically connected to the second test signal line 822, and a first electrode of the third switch tube 723 is electrically connected to the third test signal line 823.

Figure 16:
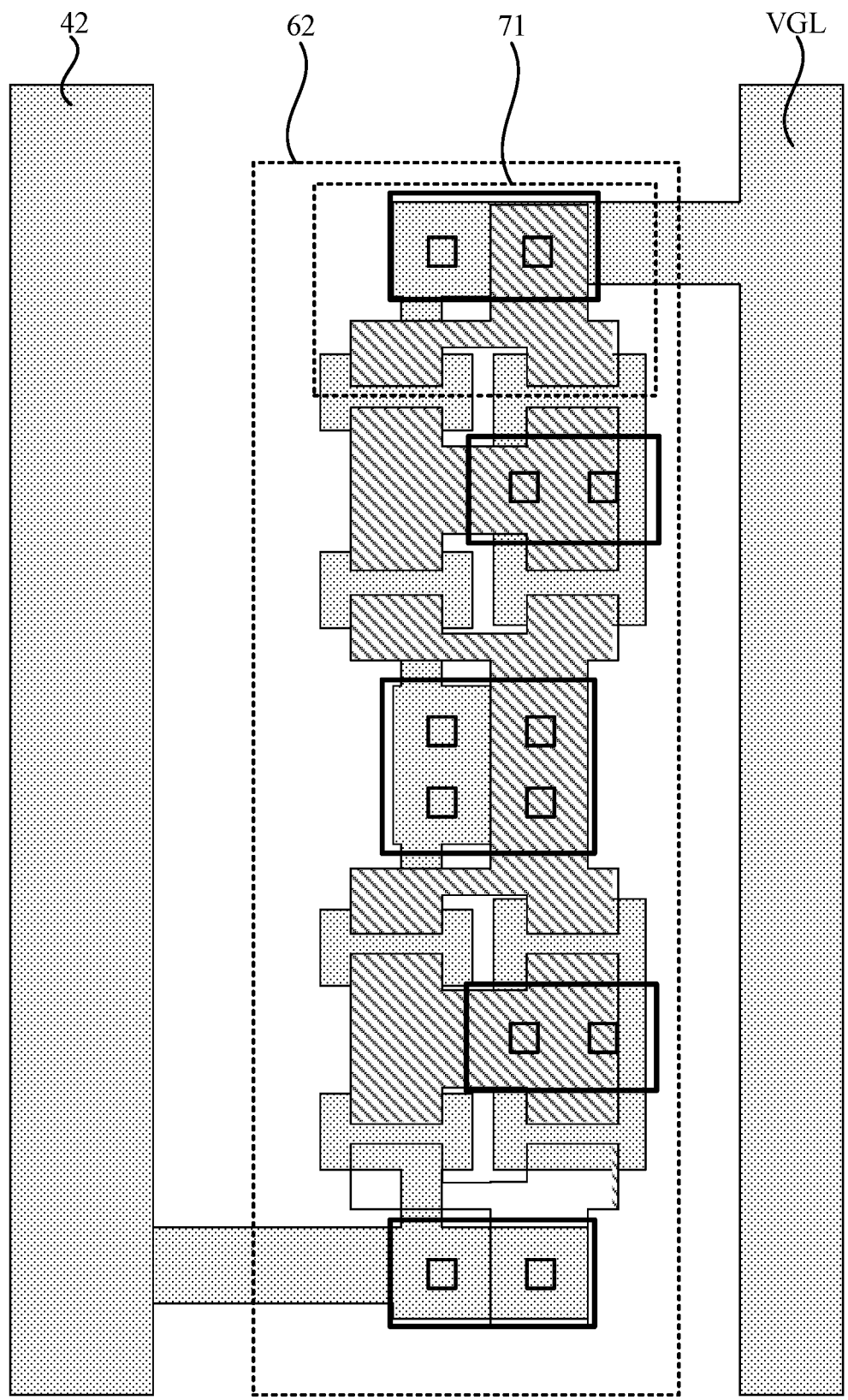
FIG. 16 is a structural diagram of a second electrostatic discharge circuit according to an embodiment of the present disclosure.

FIG. 16 is a structural diagram of a second electrostatic discharge circuit according to an embodiment of the present disclosure. Referring to FIGS. 13 and 16, the array substrate further includes at least one second electrostatic discharge circuit 62 (FIG. 13 illustrates one second electrostatic discharge circuit 62 as an example) and a second common electrode line 42 located on a side of the constant voltage low potential line VGL facing away from the display area 10. A first end of the at least one second electrostatic discharge circuit 62 is electrically connected to the constant voltage low potential line VGL, and a second end of the at least one second electrostatic discharge circuit 62 is electrically connected to the second common electrode line 42. In the embodiment of the present disclosure, the constant voltage low potential line VGL is further connected with the second electrostatic discharge circuit 62. The second electrostatic discharge circuit 62 may conduct the static electricity on the constant voltage low potential line VGL and the protection line 30 to the second common electrode line 42 to prevent the static electricity accumulation on the constant voltage low potential line VGL and the protection line 30.

In an embodiment, referring to FIGS. 13 and 16, the second electrostatic discharge circuit 62 includes multiple first thin film transistors 71. Referring to FIG. 9, each of the multiple first thin film transistors 71 includes a gate 713, a first electrode 711, a second electrode 712 and a second wire changing layer 232. The second wire changing layer 232 is electrically connected to the first electrode 711 of the first thin film transistor 71 through a sixth via hole 246 and is electrically connected to the gate 713 of the first thin film transistor 71 through a seventh via hole 247. The first electrode 711 of the first thin film transistor 71 is electrically connected to the gate 713 of the first thin film transistor 71 through the second wire changing layer 232. The first wire changing layer 231 is in a same layer as the second wire changing layer 232, and the first wire changing layer 231, the first thin film transistor 71, and the second wire changing layer 232 are arranged in a second direction. In the embodiment of the present disclosure, the protection line 30 also protects the second wire changing layer 232 in the second electrostatic discharge circuit 62, reducing the risk of open circuit caused by the corrosion of the second wire changing layer 232 in the second electrostatic discharge circuit 62.

Referring to FIG. 10, in a direction perpendicular to the substrate, a thickness of the first wire changing layer 231 is W, and W≥1000 angstroms. In this field, the thickness of the wire changing layer is generally 500 angstroms to 750 angstroms. In the embodiment of the present disclosure, the thickness of the first wire changing layer 231 is greater than or equal to 1000 angstroms. By increasing the thickness of the first wire changing layer 231, the corrosion resistance of the first wire changing layer 231 is enhanced. It should be noted that the manner of increasing the thickness of the first wire changing layer 231 may be applied to various embodiments of the present disclosure.

Figure 17:
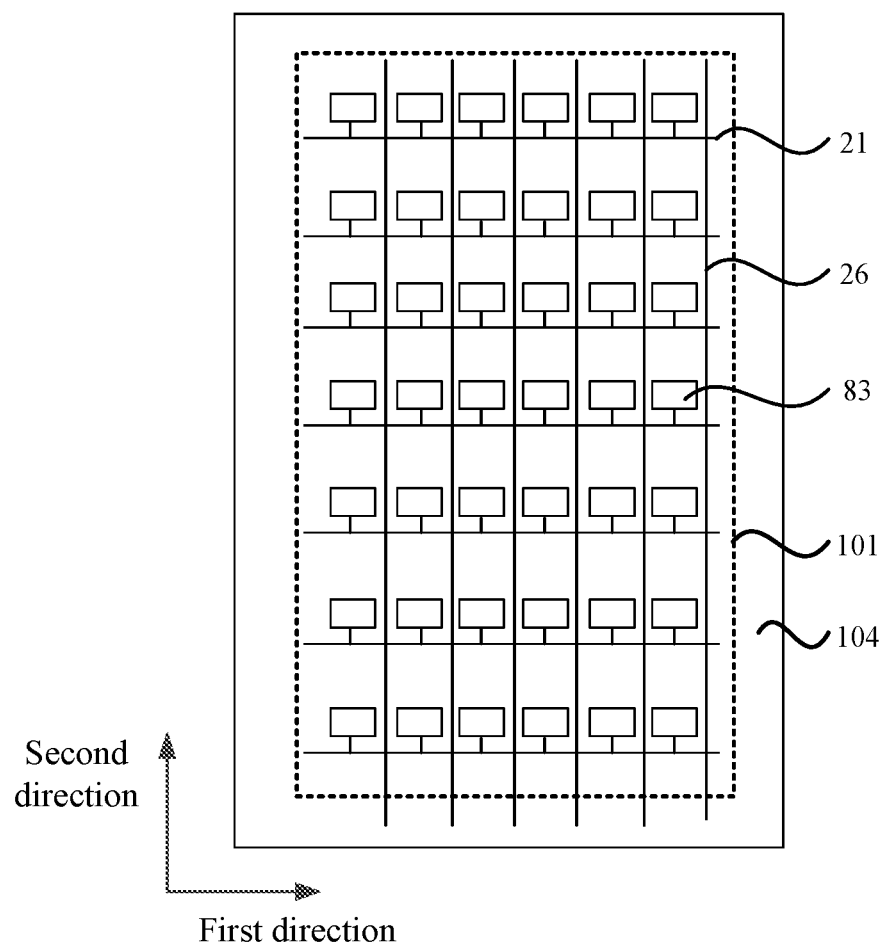
FIG. 17 is a structural diagram of another array substrate according to an embodiment of the present disclosure.
Figure 18:
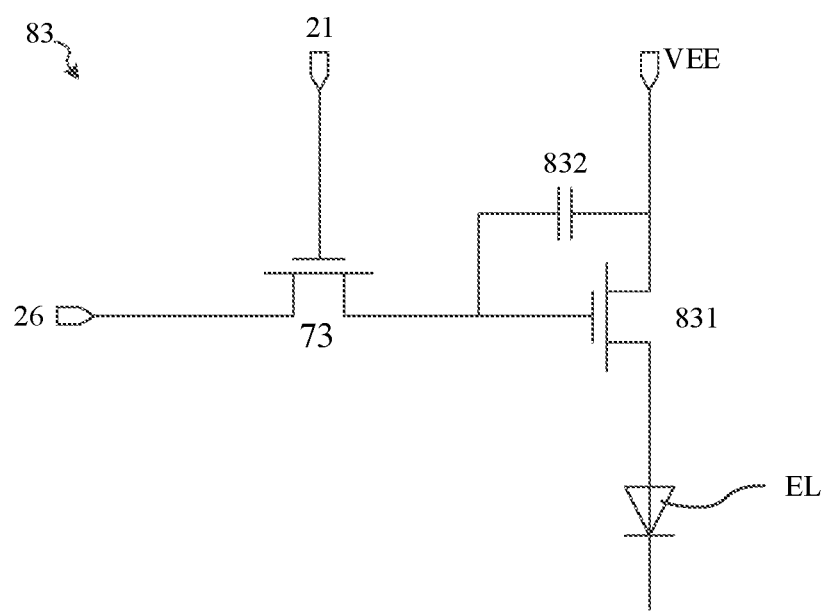
FIG. 18 is a circuit diagram of a pixel driving circuit according to an embodiment of the present disclosure.

FIG. 17 is a structural diagram of another array substrate according to an embodiment of the present disclosure. FIG. 18 is a circuit diagram of a pixel driving circuit according to an embodiment of the present disclosure. Referring to FIGS. 17 and 18, the array substrate further includes a pixel driving circuit 83. The pixel driving circuit 83 is located in the display area 101. Multiple pixel driving circuits 83 may be arranged in an array in a first direction and a second direction in the display area 101. Each of the multiple pixel driving circuits 83 includes a third thin film transistor 73. The third thin film transistor 73 includes a gate, a first electrode, and a second electrode, and the gate of the third thin film transistor 73 is electrically connected to the signal line 21. The third thin film transistor 73 is an N-type thin film transistor. In the embodiment of the present disclosure, the signal line 21 is electrically connected to the gate of the third thin film transistor 73, and the third thin film transistor 73 is the N-type thin film transistor, so that in a case where an electrical signal on the signal line 21 is at a low level, the N-type thin film transistor is turned off, and the low level is an ineffective level of the third thin film transistor 73, and in a case where the electrical signal on the signal line 21 is at a high level, the N-type thin film transistor is turned on, and the high level is the effective level of the third thin film transistor 73. Since the low level is the ineffective level of the third thin film transistor 73, a time for applying the low level on the signal line 21 is longer than a time for applying the high level on the signal line 21, and the signal line 21 has been applied the low level for a long time, thus the signal line 21 needs to be protected by the protection line 30 particularly. It is to be noted that the high level on the signal line 21 is larger than the low level on the signal line 21, and the high level on the signal line 21 and a low level on the signal line 21 both are a voltage applied to the signal line 21, so that the high level on the signal line 21 and the level on the signal line 21 are the first voltage.

In an embodiment, referring to FIG. 18, each of the multiple pixel driving circuits 83 includes a third thin film transistor 73, a pixel driving transistor 831, a capacitor 832 and a light-emitting element EL. When the pixel driving circuits 83 operate, a scanning signal input from the signal line 21 controls the third thin film transistor 73 to turn on, a data signal input from the data line 26 and a voltage signal input from a power supply signal terminal VEE charge the capacitor 832, and controls the pixel driving transistor 831 to generate a driving current to drive the light-emitting element EL, driving the light-emitting element EL to emit light and display. It is to be noted that the light-emitting element EL in the embodiment of the present disclosure may be an organic light-emitting element or an inorganic light-emitting element, the pixel driving circuit 83 provided in the embodiment of the present disclosure is only an example and is not intended to limit the present disclosure. The array substrate in the embodiment of the present disclosure may be applied to an organic light-emitting display panel, a micro light-emitting diode display panel, a liquid crystal display panel and the like.

Figure 19:
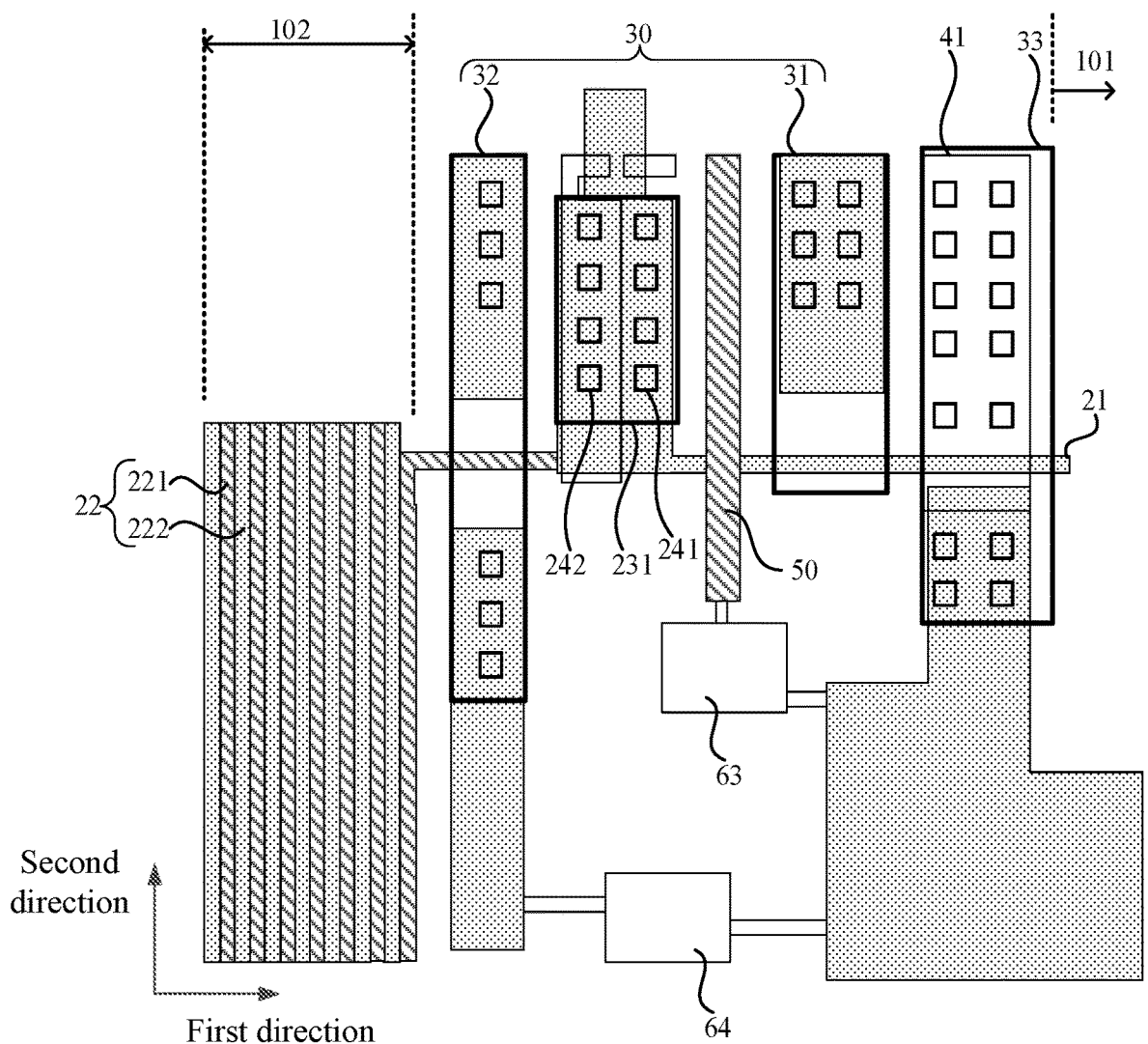
FIG. 19 is an enlarged view of an area S3 of FIG. 1.

FIG. 19 is an enlarged view of an area S3 of FIG. 1. Referring to FIGS. 1 and 19, multiple connection lines 22 extend in the second direction and are arranged in the first direction. The array substrate also includes a third electrostatic discharge circuit 63 and a fourth electrostatic discharge circuit 64. A first end of the third electrostatic discharge circuit 63 is electrically connected to an electrostatic discharge line 50, and a second end of the third electrostatic discharge circuit 63 is electrically connected to a first common electrode line 41. The third electrostatic discharge circuit 63 may conduct the static electricity on the electrostatic discharge line 50 to the first common electrode line 41 to prevent the static electricity accumulation on the electrostatic discharge line 50. A first end of the fourth electrostatic discharge circuit 64 is electrically connected to the protection line 30 (specifically a second protection line 32), a second end of the fourth electrostatic discharge circuit 64 is electrically connected to the first common electrode line 41, and the fourth electrostatic discharge circuit 64 may conduct the static electricity on the protection line 30 to the first common electrode line 41 to prevent the static electricity accumulation on the protection line 30. Circuit structures of the third electrostatic discharge circuit 63 and the fourth electrostatic discharge circuit 64 are similar to a circuit structure of the first electrostatic discharge circuit 61, which will not be described here.

In an embodiment, referring to FIGS. 4 and 5, in a direction perpendicular to the substrate 10, a number of first via holes 241 overlapped the first wire changing layer 231 is greater than two, and a number of second via holes 242 overlapped the first wire changing layer 231 is greater than two. In the embodiment of the present disclosure, in the direction perpendicular to the substrate 10, at least three first via holes 241 are arranged to be overlapped the first wire changing layer 231 so as to electrically connect the first wire changing layer 231 to the signal line 21. At least three second via holes 242 are arranged to be overlapped the first wire changing layer 231 so as to electrically connect the first wire changing layer 231 to the first connection line 221. Therefore, the number of first via holes 241 and the number of second via holes 242 are increased. Even if the first wire changing layer 231 at one or two first via holes 241 is corroded or the first wire changing layer 231 at one or two second via holes 242 is corroded, the electrical connection between the signal line 21 and the first connection line 221 can be ensured, thereby enhancing the corrosion resistance of the first wire changing layer 231. It is to be noted that the manner of increasing the number of first via holes 241 and the number of second via holes 242 may be applied to various embodiments of the present disclosure.

Figure 20:
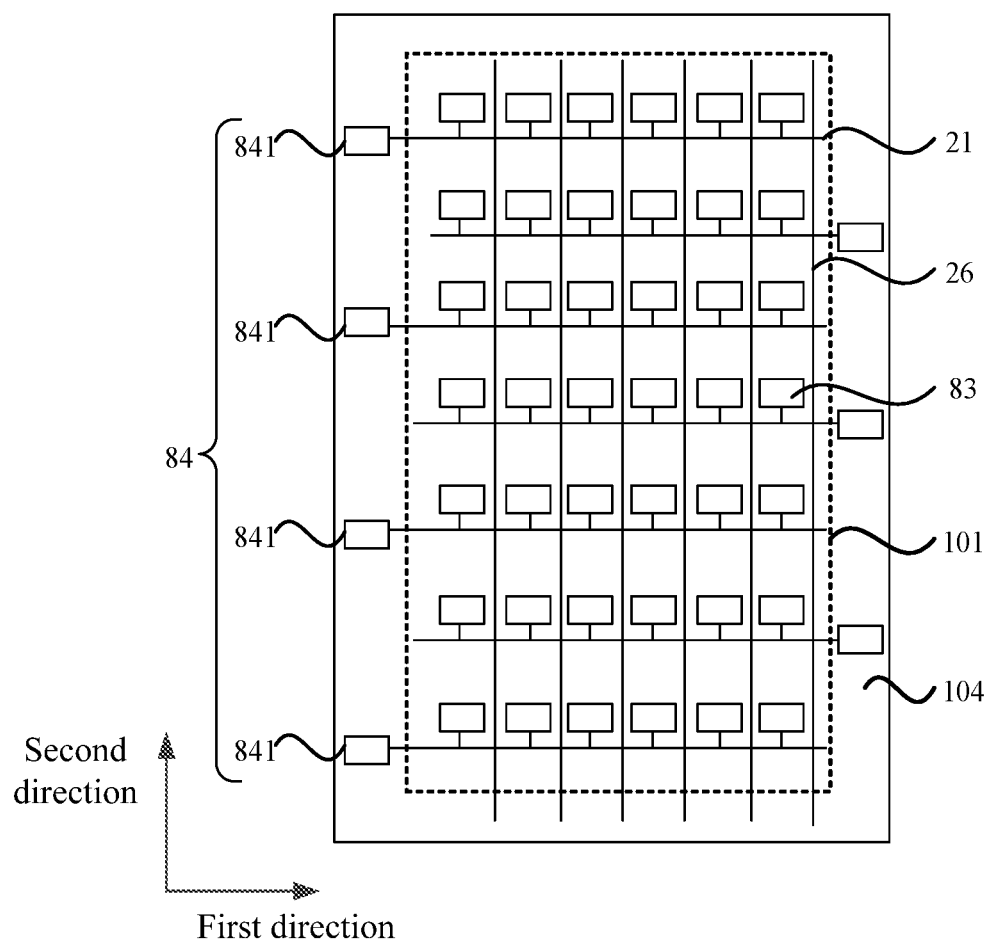
FIG. 20 is a structural diagram of another array substrate according to an embodiment of the present disclosure.
Figure 21:
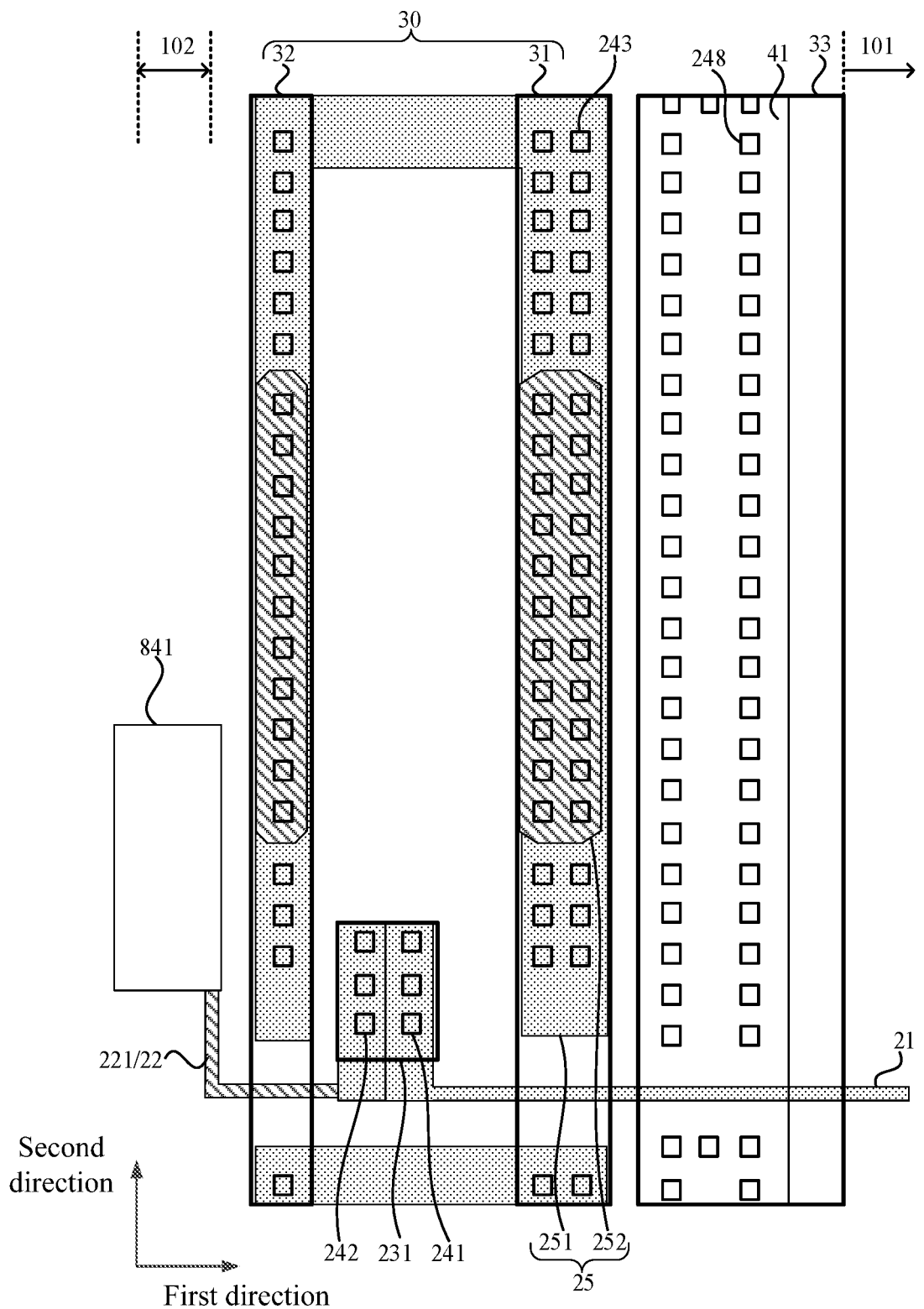
FIG. 21 is a structural diagram of another array substrate according to an embodiment of the present disclosure.
Figure 22:
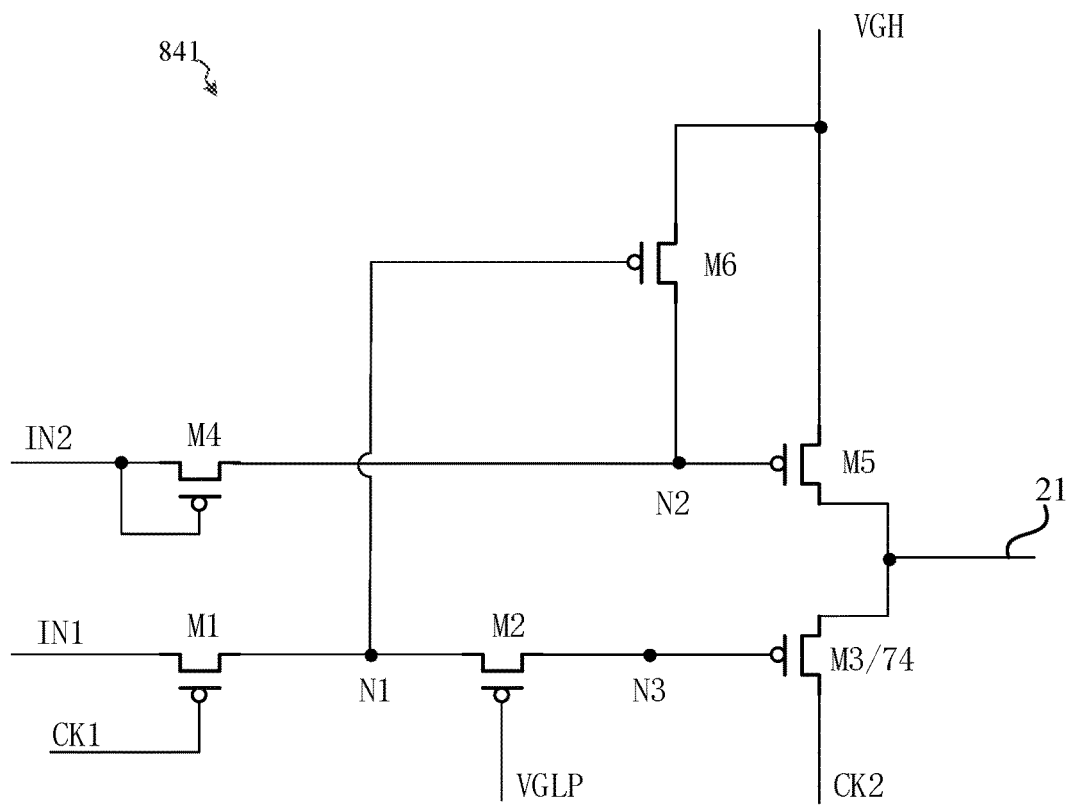
FIG. 22 is a circuit diagram of a shift register according to an embodiment of the present disclosure.

FIG. 20 is a structural diagram of another array substrate according to an embodiment of the present disclosure. FIG. 21 is a structural diagram of another array substrate according to an embodiment of the present disclosure. FIG. 22 is a circuit diagram of a shift register according to an embodiment of the present disclosure. Referring to FIGS. 20 to 22, the array substrate further includes a gate driving circuit 84. The gate driving circuit 84 includes multiple shift registers 841 cascaded, each of the multiple shift registers 841 includes a fourth thin film transistor 74, a source and a drain of the fourth thin film transistor 74 are in a same layer as the first connection line 221, and the source or the drain of the fourth thin film transistor 74 is electrically connected to the first connection line 221. In the embodiment of the present disclosure, the array substrate further includes a gate driving circuit 84. The gate driving circuit 84 is integrated in a peripheral area of the array substrate so as to effectively improve the integration level of the display device and reduce the manufacturing cost while implementing the narrow bezel design. One end of the first connection line 221 is electrically connected to the source or the drain of the fourth thin film transistor 74, and the other end of the first connection line 221 is electrically connected to the signal line 21 through the first wire changing layer 231.

Figure 23:
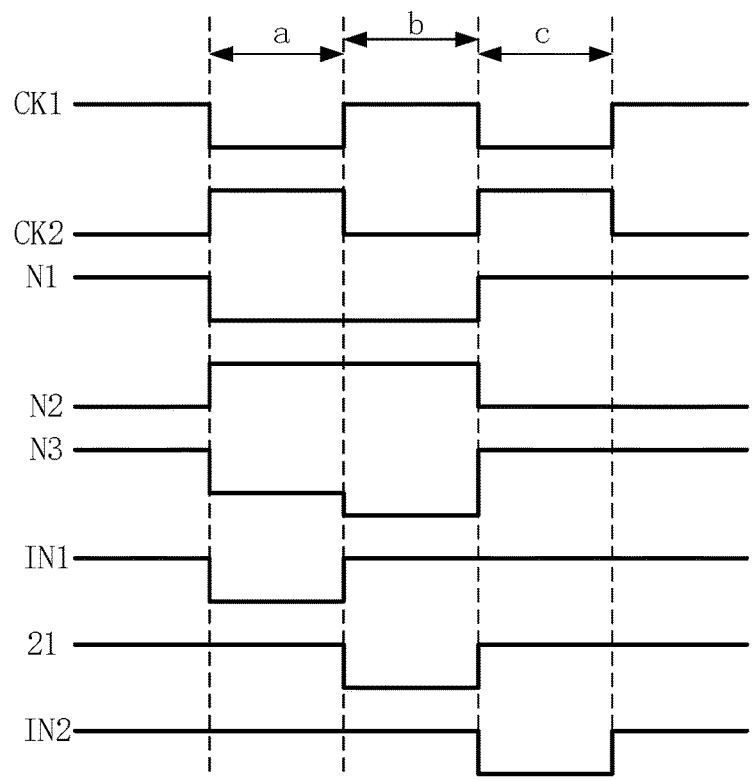
FIG. 23 is a working timing diagram of a shift register of FIG. 22.

FIG. 23 is a working timing diagram of a shift register of FIG. 22. Referring to FIGS. 22 and 23, a shift register 841 provided by the embodiment of the present disclosure includes a first transistor M1, a second transistor M2, a third transistor M3 (which is the fourth thin film transistor 74), a fourth transistor M4, a fifth transistor M5 and a sixth transistor M6. A gate of the first transistor M1 is electrically connected to a first clock signal terminal CK1, a source of the first transistor M1 is electrically connected to a first input terminal IN1, a drain of the first transistor M1 is electrically connected to a source of the second transistor M2 and a gate of the sixth transistor M6 to a point N1. A gate of the second transistor M2 is electrically connected to a first level signal terminal VGLP, the source of the second transistor M2 is electrically connected to the drain of the first transistor M1 and the gate of the sixth transistor M6 to the point N1, and a drain of the second transistor M2 and a gate of the third transistor M3 are electrically connected to a point N3. The gate of the third transistor M3 is electrically connected to the drain of the second transistor M2, a source of the third transistor M3 is electrically connected to a second clock signal terminal CK2, and a drain of the third transistor M3 is electrically connected to the signal line 21 and a drain of the fifth transistor M5. A gate of the fourth transistor M4 is electrically connected to a source of the fourth transistor M4 and is electrically connected to a second input terminal IN2, and a drain of the fourth transistor M4 is electrically connected to a gate of the fifth transistor M5 and a drain of the sixth transistor M6 to a point N2. The gate of the fifth transistor M5 is electrically connected to the drain of the fourth transistor M4 and the drain of the sixth transistor M6 to the point N2, a source of the fifth transistor M5 is electrically connected to a second level signal terminal VGH and a source of the sixth transistor M6, and the drain of the fifth transistor M5 is electrically connected to the signal line 21 and the drain of the third transistor M3. The gate of the sixth transistor M6 is electrically connected to the drain of the first transistor M1 and the source of the second transistor M2, the source of the sixth transistor M6 is electrically connected to the second level signal terminal VGH and the source of the fifth transistor M5, and the drain of the sixth transistor M6 is electrically connected to the drain of the fourth transistor M4 and the gate of the fifth transistor M5 to the point N2. The first transistor M1, the second transistor M2, the third transistor M3, the fourth transistor M4, the fifth transistor M5, and the sixth transistor M6 are all PMOS transistors.

In this embodiment, an input signal of the first level signal terminal VGLP is a low level signal, an input signal of the second level signal terminal VGH is a high level signal, a first input signal is input by the first input terminal IN1, a second input signal is input by the second input terminal IN2, a first clock signal is input by the first clock signal terminal CK1, and a second clock signal is input by the second clock signal terminal CK2. The second clock signal is a reverse signal of the first clock signal.

A driving process of the shift register provided by the embodiment of the present disclosure is divided into three stages, i.e., a reset stage a, a shift stage b, and a turn-off stage c.

In the reset stage a, the first clock signal is input to the first clock signal terminal CK1, the first clock signal is a low-level pulse signal, the first clock signal is a low-level signal in the reset stage a, and the first transistor M1 is turned on. The first transistor M1 transmits the low-level signal input to the first input terminal IN1 to the gate of the sixth transistor M6 and the source of the second transistor M2, a potential at the point N1 is at the low level, in this case, the sixth transistor M6 is turned on. Since the source of the sixth transistor M6 is connected to the second level signal terminal VGH, the second level signal terminal VGH is connected to a second level signal, the second level signal is the high level signal, i.e., a level value of this signal is constant, and the level value is higher than a level value of a subsequent first level signal, thus the sixth transistor M6 transmits the high level signal to the gate of the fifth transistor M5, a potential at the point N2 is at the high level, and the fifth transistor M5 is turned off, so that the change of an output value is not affected by the fifth transistor M5. The first level signal is input by the first level signal terminal VGLP, the first level signal is the low level signal, that is, a level value of this signal is constant and the level value is lower than a level value of the above-mentioned second level signal, and the second transistor M2 is turned on. The second transistor M2 transmits the low-level signal transmitted by the first transistor M1 to the gate of the third transistor M3, a potential at the point N3 is at the low level, and the third transistor M3 is turned on. Since the fifth transistor M5 does not affect the change of the output value, an output of the signal line 21 is only a value of the second clock signal input to the second clock signal terminal and transmitted by the third transistor M3, and the second clock signal is the reverse signal of the first clock signal, in this case, the second clock signal is at the high level, that is, an output of an output terminal OUT is also at the high level, and a reset adjustment is performed on the whole register.

In the shift stage b, the first clock signal is input to the first clock signal terminal CK1 and turns to be at the high level, and the first transistor M1 is turned off, in this case, the potential at the point N1 remains at the low level in the reset stage a, and the sixth transistor M6 is continuously turned on. Since the gate of the second transistor M2 is always a low level signal, the second transistor M2 is continuously turned on, and the third transistor M3 is also continuously turned on, in this case, the second clock signal input to the second clock signal terminal CK2 turns to be the low level, and the potential at the point N3 is pulled lower due to the coupling effect of the circuit, in this case, the second transistor M2 can suppress the leakage current of the parasitic capacitance from being too large, thus the circuit stability can be maintained. Meanwhile, the high level is still input to the second input terminal IN2, the fourth transistor M4 is continuously to be turned off, the high level input to the second level signal terminal transmitted by the sixth transistor M6 is still input to the gate of the fifth transistor M5, and the fifth transistor M5 is turned off, which does not affect the output value of the output terminal. The third transistor M3 only transmits the low level input to the second clock signal terminal to the output terminal, thus embodying the shift function of the shift register, that is, shifting a low level pulse signal of the input terminal for one stage and outputting.

Since the shift register in this embodiment is usually used in a gate driver, the shift register also has a holding function for a period of time, that is, the shift register needs to maintain a good high-level output, which is the turn-off stage c.

In the turn-off stage c, the first clock signal input to the first clock signal terminal CK1 turns to be at the low level, the first transistor M1 is turned on. The first transistor M1 transmits the high level input to the first input terminal IN1 to the gate of the sixth transistor M6 and the source of the second transistor M2, the potential at the point N1 is at the high level, the sixth transistor M6 is turned off. Since the gate of the second transistor M2 is always the low-level signal, the second transistor M2 is continuously turned on and the high-level signal transmitted by the first transistor M1 is transmitted to the gate of the third transistor M3, the potential at the point N3 is at the high level, and the third transistor M3 is turned off and does not affect the output of the circuit. The second input signal input to the second input terminal IN2 turns to be at the low level, the fourth transistor M4 is turned on. The fourth transistor M4 transmits the low-level signal to the gate of the fifth transistor M5. Since the sixth transistor M6 is turned off, the potential at the point N2 is at the low level and the fifth transistor M5 is turned on. The fifth transistor M5 transmits the high-level signal connected to the second level signal terminal to the output terminal.

A clock signal line is connected to the first clock signal terminal CK1 and the second clock signal terminal CK2, a constant voltage low-potential line VGL is connected to the first level signal terminal VGLP, and a high-level signal line is connected to the second level signal terminal VGH. A gate driving circuit signal line may include the clock signal line, the low-level signal line and the high-level signal line. The first transistor M1, the second transistor M2, the third transistor M3, the fourth transistor M4, the fifth transistor M5, and the sixth transistor M6 may be thin film transistors.

In an embodiment, referring to FIG. 21, the shift register 841 and the connection line 22 are both located in the wiring area 102. The protection line 30 is located between the wiring area 102 and the first common electrode line 41. The protection line 30 includes a first protection line 31 and a second protection line 32. The first protection line 31 and the second protection line 32 are both located between the wiring area 102 and the first common electrode line 41.

As shown in FIG. 22, the gate of the fourth transistor M4 is electrically connected to the source of the fourth transistor M4, the drain of the fourth transistor M4 is electrically connected to the gate of the fifth transistor M5, the source of the second transistor M2 is electrically connected to the gate of the sixth transistor M6, and the drain of the second transistor M2 is electrically connected to the gate of the third transistor M3. In a case where the source or the drain of the thin film transistor in the shift register 841 is electrically connected to the gate of the thin film transistor through the wire changing layer, the source or the drain of the thin film transistor is electrically connected to a gate of another thin film transistor through the wire changing layer. The protection line 30 may also protect the wire changing layer in the shift register 841.

Figure 24:
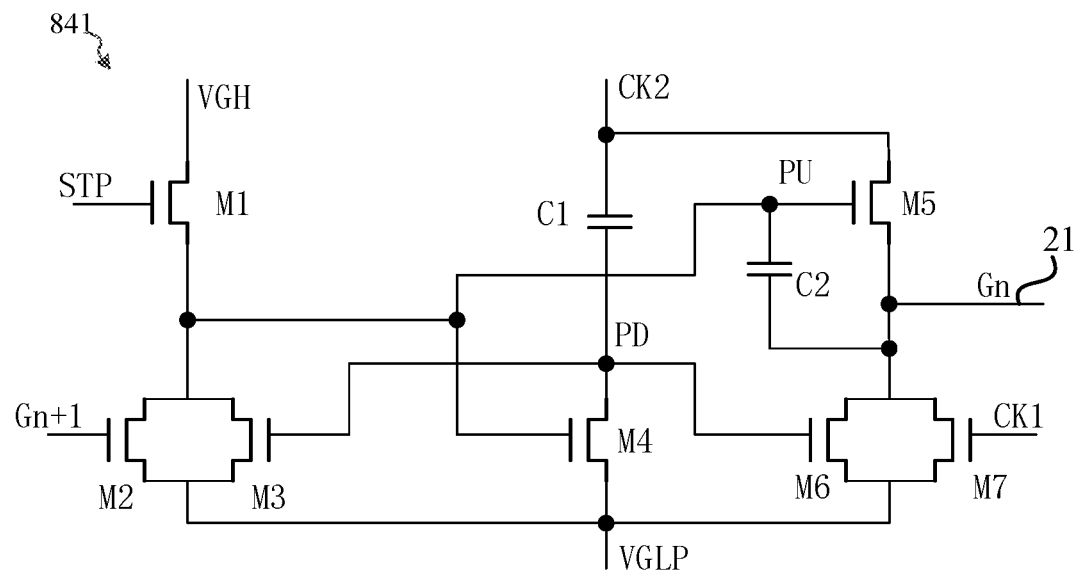
FIG. 24 is a circuit diagram of another shift register according to an embodiment of the present disclosure.
Figure 25:
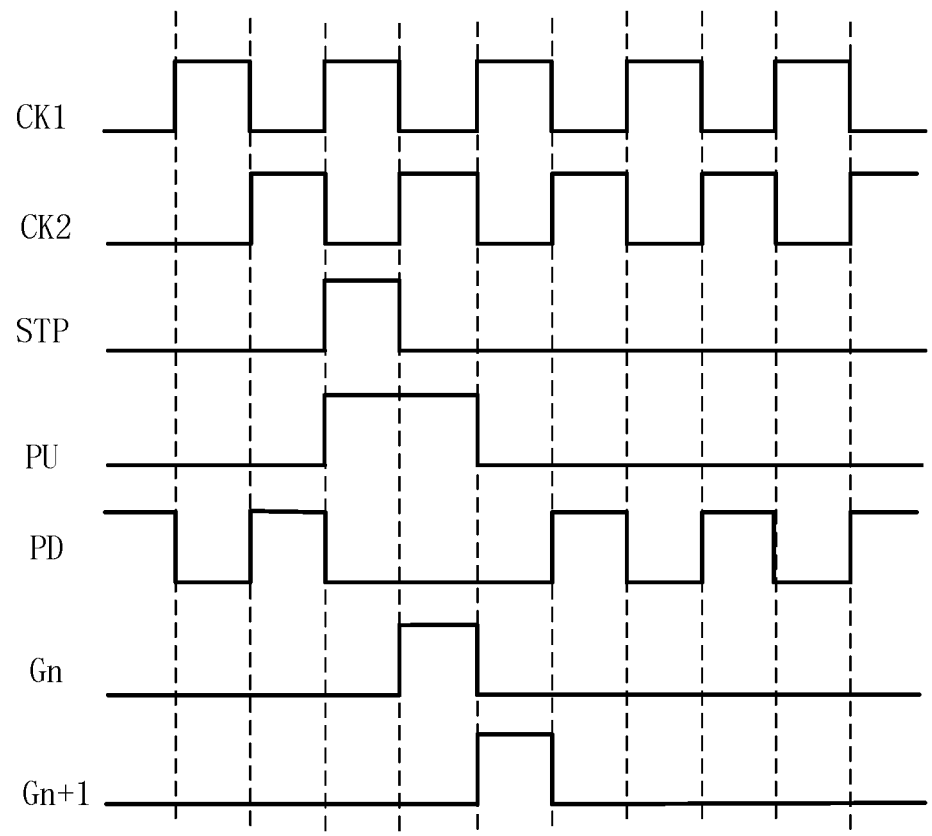
FIG. 25 is a working timing diagram of a shift register of FIG. 24.

FIG. 24 is a circuit diagram of another shift register according to an embodiment of the present disclosure. FIG. 25 is a working timing diagram of a shift register of FIG. 24. Referring to FIGS. 24 and 25, an embodiment of the present disclosure provides a shift register 841. The shift register 841 includes a first transistor M1, a second transistor M2, a third transistor M3, a fourth transistor M4, a fifth transistor M5 (which is a fourth thin film transistor 74), a sixth transistor M6, and a seventh transistor M7. A gate of the first transistor M1 is electrically connected to a first input control terminal STP, a source of the first transistor M1 is electrically connected to a second level signal terminal VGH, and a drain of the first transistor M1 is electrically connected to a PU node. A gate of the second transistor M2 is electrically connected to the signal line 21 (i.e., Gn+1) driven by a next-stage shift register, a source of the second transistor M2 is electrically connected to the PU node, and a drain of the second transistor M2 is electrically connected to a first level signal terminal VGLP. A gate of the third transistor M3 is electrically connected to a PD node, a source of the third transistor M3 is electrically connected to the PU node, and a drain of the third transistor M3 is electrically connected to the first level signal terminal VGLP. A gate of the fourth transistor M4 is electrically connected to the PU node, a source of the fourth transistor M4 is electrically connected to the PD node, and a drain of the fourth transistor M4 is electrically connected to the first level signal terminal VGLP. A gate of the fifth transistor M5 is electrically connected to the PU node, a source of the fifth transistor M5 is electrically connected to a second clock signal terminal CK2, and a drain of the fifth transistor M5 is electrically connected to the signal line 21 (i.e., Gn) driven by a current-stage shift register. A gate of the sixth transistor M6 is electrically connected to the PD node, a source of the sixth transistor M6 is electrically connected to the drain of the fifth transistor M5, and a drain of the sixth transistor M6 is electrically connected to the first level signal terminal VGLP. A gate of the seventh transistor M7 is electrically connected to the first clock signal terminal CK1, a source of the seventh transistor M7 is electrically connected to the drain of the fifth transistor M5, and a drain of the seventh transistor M7 is electrically connected to the first level signal terminal VGLP. The shift register 841 also includes a first capacitor C1 and a second capacitor C2. A first electrode plate of the first capacitor C1 is electrically connected to the second clock signal terminal CK2, and a second electrode plate of the first capacitor C1 is electrically connected to the PD node. A first electrode plate of the second capacitor C2 is electrically connected to the PU node, and a second electrode plate of the second capacitor C2 is electrically connected to the drain of the fifth transistor M5.

Figure 26:
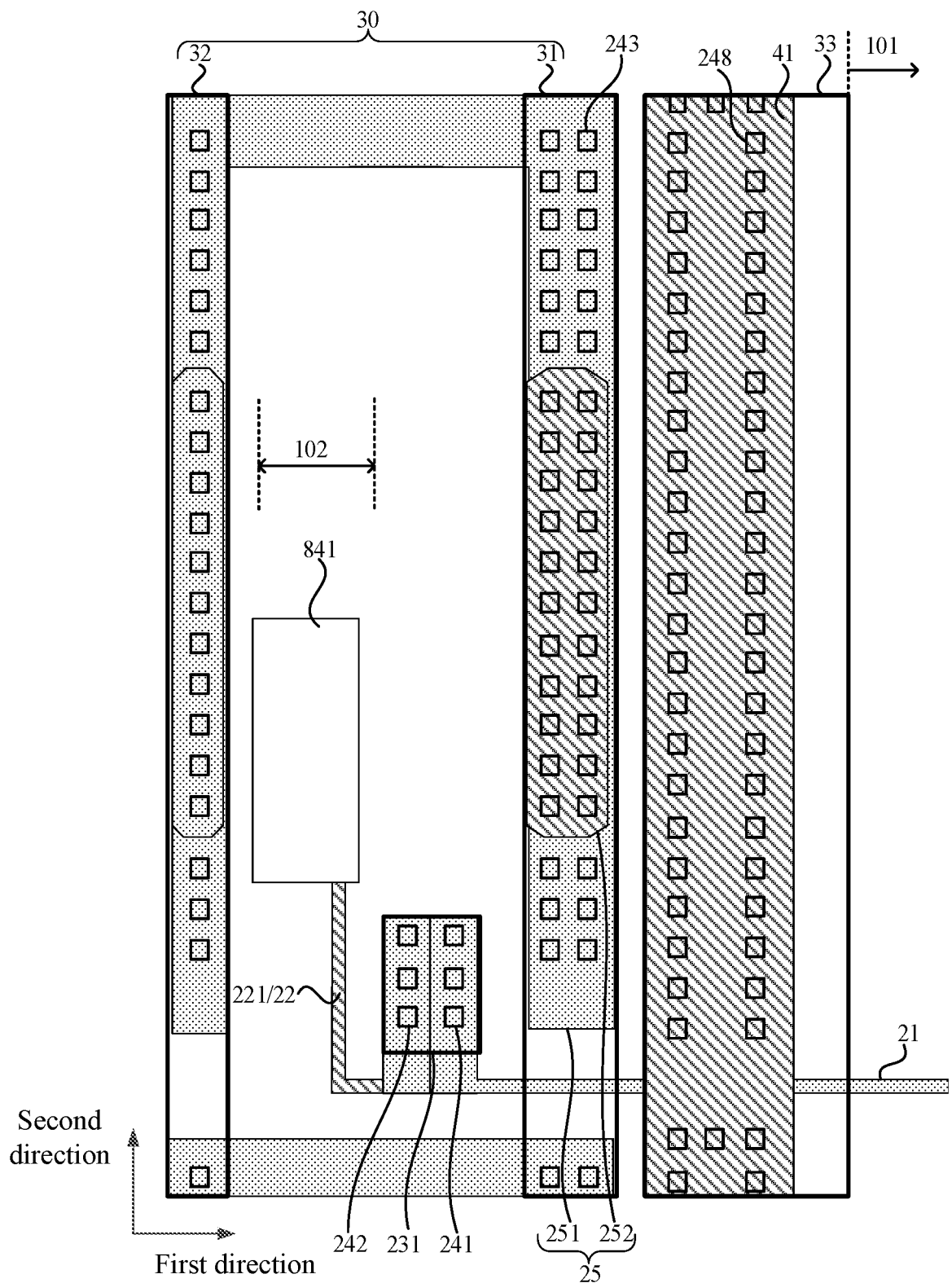
FIG. 26 is a structural diagram of another array substrate according to an embodiment of the present disclosure.

FIG. 26 is a structural diagram of another array substrate according to an embodiment of the present disclosure. Referring to FIGS. 20 and 26, a gate driving circuit 84 is located in a wiring area 102, and the gate driving circuit 84 includes multiple shift registers 841 cascaded. The shift register 841 and the connection line 22 are both located in the wiring area 102. The protection line 30 includes a first protection line 31 and a second protection line 32, the first protection line 31 is located between the wiring area 102 and the first common electrode line 41, and the wiring area 102 is located between the first protection line 31 and the second protection line 32. The first protection line 31 and the second protection line 32 surround the shift register 841, further reducing the electrochemical reaction occurring on a wire changing layer in the shift register 841.

In an embodiment, referring to FIG. 26, in a first direction, the first protection line 31 is located between the shift register 841 and the first common electrode line 41. A distance between the first protection line 31 and the first common electrode line 41 is smaller than a distance between the shift register 841 and the first common electrode line 41. With respect to the shift register 841, an electrolytic cell is more easily formed between the first protection line 31 and the first common electrode line 41 than the shift register 841. The first common electrode line 41 serves as an anode of the electrolytic cell, and the first protection line 31 serves as a cathode of the electrolytic cell, so that the electrochemical reaction preferentially occurs on the first protection line 31, which weakens the electrochemical reaction occurring on the shift register 841 and reduces the risk of open circuit caused by the corrosion of the wire changing layer in the shift register 841.

Figure 27:
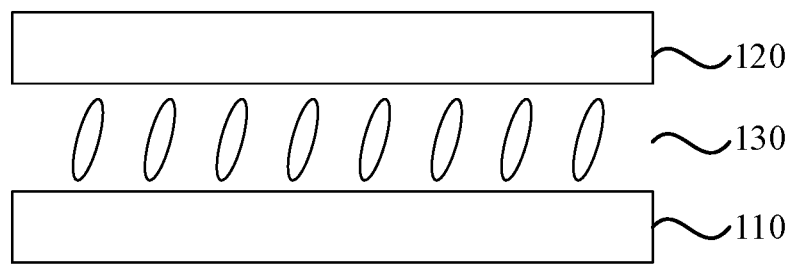
FIG. 27 is a sectional view of a liquid crystal display panel according to an embodiment of the present disclosure.

FIG. 27 is a sectional view of a liquid crystal display panel according to an embodiment of the present disclosure. Referring to FIG. 27, a liquid crystal display panel includes an array substrate 110, a liquid crystal layer 130, and a counter substrate 120. The liquid crystal layer 130 is located between the array substrate 110 and the counter substrate 120. The liquid crystal layer 130 includes multiple liquid crystal molecules. The liquid crystal display panel in the embodiment of the present disclosure may include the array substrate 110 in the above embodiments, thereby having the beneficial effects of the above array substrate 110, that is, the electrochemical reaction occurring on the first wire changing layer 231 is weakened, and the risk of open circuit caused by the corrosion of the first wire changing layer 231 is reduced. Furthermore, the working stability of the liquid crystal display panel is improved, and the service life of the liquid crystal display panel is prolonged.

Figure 28:
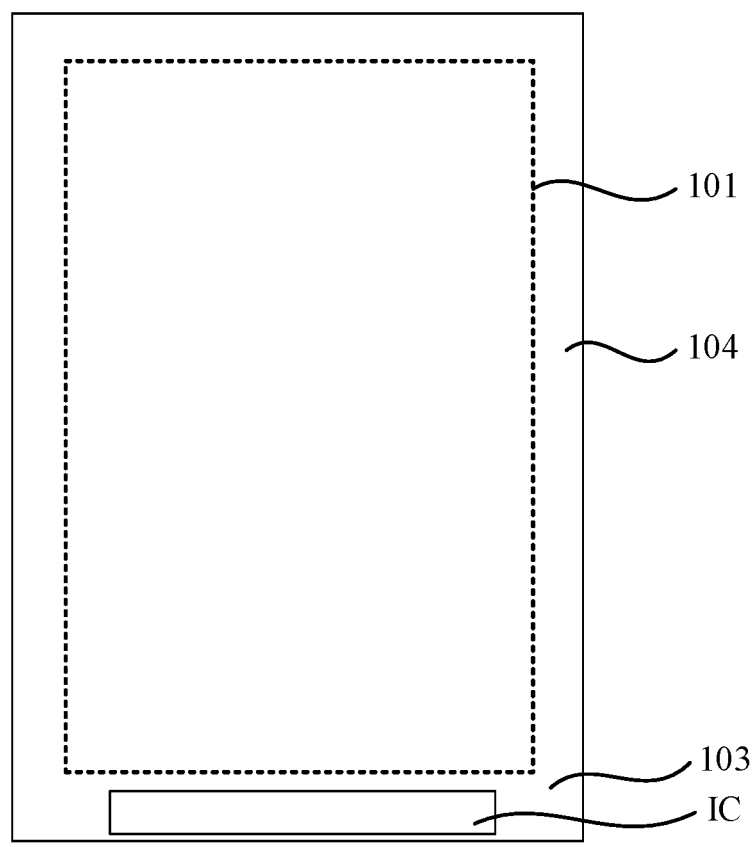
FIG. 28 is a structural diagram of a display device according to an embodiment of the present disclosure.

FIG. 28 is a structural diagram of a display device according to an embodiment of the present disclosure. Referring to FIG. 28, the display device includes the liquid crystal layer described in the above embodiments. The display device may specifically be a mobile phone, a tablet computer, an in-vehicle display device, a smart wearable device and the like.

In an embodiment, referring to FIG. 28, the display device further includes a driver chip IC. The driver chip IC is bound to a step area 103. In other embodiments, the driver chip IC may also be bound to a flexible circuit board. The driver chip IC may be used for driving the signal line 21 in the above embodiments and the driver chip IC may be used for driving the data line 26 in the above embodiment.

Figure 29:
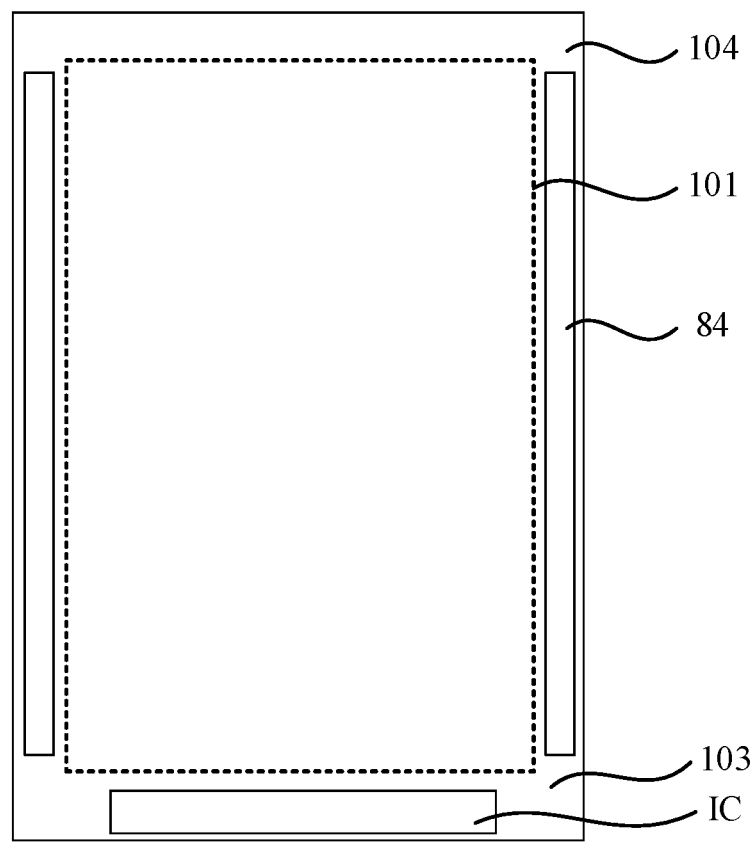
FIG. 29 is a structural diagram of another display device according to an embodiment of the present disclosure.

FIG. 29 is a structural diagram of another display device according to an embodiment of the present disclosure. The display device also includes a driver chip IC. The driver chip IC is bound to a step area 103. The driver chip IC drives a gate driving circuit 84. Referring to FIG. 20, a shift register 841 in the gate driving circuit 84 is electrically connected to the signal line 21. The gate driving circuit 84 may be used for driving the signal line 21 in the above embodiment. The driver chip IC may be used for driving the data line 26 in the above embodiments.

It is to be noted that the preceding are only preferred embodiments of the present disclosure and the technical principles used therein. It is to be understood by those skilled in the art that the present disclosure is not limited to the embodiments described herein. For those skilled in the art, various apparent modifications, adaptations, combinations, and substitutions can be made without departing from the scope of the present disclosure. Therefore, while the present disclosure has been described in detail via the preceding embodiments, the present disclosure is not limited to the preceding embodiments and may include more equivalent embodiments without departing from the inventive concept of the present disclosure. The scope of the present disclosure is determined by the scope of the appended claims.

What is claimed is:

1. An array substrate, comprising:
a display area and a frame area, wherein the frame area is located on a periphery of the display area and comprises a wiring area;
a substrate;
a plurality of signal lines, wherein at least part of the plurality of signal lines are located in the display area, and the plurality of signal lines extend in a first direction and are arranged in a second direction, wherein the first direction intersects the second direction;
a plurality of connection lines, wherein at least part of the plurality of connection lines are located in the wiring area, and the plurality of connection lines comprises a first connection line, and the first connection line is located on a side of the signal line facing away from the substrate;
a first wire changing layer, wherein the first wire changing layer is located between the display area and the wiring area, and the first wire changing layer is located on a side of both the signal line and the connection line facing away from the substrate, and wherein the first wire changing layer is electrically connected to the signal line through a first via hole and is electrically connected to the first connection line through a second via hole;
a first common electrode line, wherein in the first direction, the first common electrode line is located between the first wire changing layer and the display area; and
at least one protection line, wherein in the first direction, the at least one protection line is located between the wiring area and the display area, and the at least one protection line is in a same layer as the first wire changing layer; and wherein a voltage value applied to the signal line is a first voltage, a voltage value applied to the at least one protection line is a second voltage, and the first voltage is greater than or equal to the second voltage;
wherein the at least one protection line comprises a first protection line, and in the first direction, the first protection line is located between the first wire changing layer and the first common electrode line;
wherein the at least one protection line further comprises a second protection line, and in the first direction, the second protection line is located between the first wire changing layer and the wiring area; and
wherein in the first direction, a width of the first protection line is greater than a width of the second protection line.

2. The array substrate of claim 1, further comprising:
a first common electrode line, wherein in the first direction, the first common electrode line is located between the first wire changing layer and the display area; and
the at least one protection line comprises a first protection line, and in the first direction, the first protection line is located between the first common electrode line and the display area.

3. The array substrate of claim 1, wherein the first wire changing layer and the at least one protection line each comprise a metal oxide.

4. The array substrate of claim 1, wherein the plurality of connection lines further comprises a second connection line, and the second connection line is in a same layer as the signal line; and
the first wire changing layer is electrically connected to the signal line through a fourth via hole, and is electrically connected to the second connection line through a fifth via hole.

5. The array substrate of claim 1, further comprising:
a first common electrode line, an electrostatic discharge line, and a plurality of first electrostatic discharge circuits;
in the first direction, the first common electrode line is located between the first wire changing layer and the display area;
the electrostatic discharge line and the plurality of first electrostatic discharge circuits are located between the first common electrode line and the wiring area;
a first end of each first electrostatic discharge circuit of the plurality of first electrostatic discharge circuits is electrically connected to the signal line, and a second end of the each first electrostatic discharge circuit is electrically connected to the electrostatic discharge line;
the each first electrostatic discharge circuit comprises a plurality of first thin film transistors, wherein each first thin film transistor of the plurality of first thin film transistors comprises a gate, a first electrode, a second electrode and a second wire changing layer, wherein the second wire changing layer is electrically connected to the first electrode of the each first thin film transistor through a sixth via hole and is electrically connected to the gate through a seventh via hole; and
the first wire changing layer is in a same layer as the second wire changing layer, and the first wire changing layer, the each first thin film transistor and the second wire changing layer are arranged in the second direction.

6. The array substrate of claim 1, wherein in a direction perpendicular to the substrate, a thickness of the first wire changing layer is greater than or equal to 1000 angstroms.

7. The array substrate of claim 1, further comprising:
a pixel driving circuit, wherein the pixel driving circuit is located in the display area and comprises a third thin film transistor, the third thin film transistor comprises a gate, a first electrode and a second electrode, and the gate of the third thin film transistor is electrically connected to the signal line; and
wherein the third thin film transistor is an N-type thin film transistor.

8. The array substrate of claim 1, wherein in a direction perpendicular to the substrate, a number of first via holes overlapped the first wire changing layer is greater than two and a number of second via holes overlapped the first wire changing layer is greater than two.

9. The array substrate of claim 1, further comprising:
a gate driving circuit, wherein the gate driving circuit comprises a plurality of shift registers cascaded, each of the plurality of shift registers comprises a fourth thin film transistor, a source of the fourth thin film transistor and a drain of the fourth thin film transistor are in a same layer as the first connection line, and the source of the fourth thin film or the drain of the fourth thin film transistor is electrically connected to the first connection line;
wherein the gate driving circuit is located in the wiring area.

10. A liquid crystal display panel, comprising: an array-substrate, wherein the array substrate of claim 1.

11. A display device, comprising the liquid display panel of claim 10.

12. An array substrate, comprising:
a display area and a frame area, wherein the frame area is located on a periphery of the display area and comprises a wiring area;
a substrate;
a plurality of signal lines, wherein at least part of the plurality of signal lines are located in the display area, and the plurality of signal lines extend in a first direction and are arranged in a second direction, wherein the first direction intersects the second direction;
a plurality of connection lines, wherein at least part of the plurality of connection lines are located in the wiring area, and the plurality of connection lines comprises a first connection line, and the first connection line is located on a side of the signal line facing away from the substrate;
a first wire changing layer, wherein the first wire changing layer is located between the display area and the wiring area, and the first wire changing layer is located on a side of both the signal line and the connection line facing away from the substrate, and wherein the first wire changing layer is electrically connected to the signal line through a first via hole and is electrically connected to the first connection line through a second via hole;

at least one protection line, wherein in the first direction, the at least one protection line is located between the wiring area and the display area, and the at least one protection line is in a same layer as the first wire changing layer; and wherein a voltage value applied to the signal line is a first voltage, a voltage value applied to the at least one protection line is a second voltage, and the first voltage is greater than or equal to the second voltage; and at least one auxiliary line perpendicular to a direction of the substrate, wherein the at least one auxiliary line overlaps the at least one protection line, and the at least one auxiliary line is electrically connected to the at least one protection line through a third via hole.

13. The array substrate of claim 12, wherein the at least one auxiliary line comprises a first auxiliary line, and the first auxiliary line is in a same layer as the signal line.

14. The array substrate of claim 12, wherein the at least one auxiliary line comprises a second auxiliary line, and the second auxiliary line is in a same layer as the first connection line.

15. An array substrate, comprising:
a display area and a frame area, wherein the frame area is located on a periphery of the display area and comprises a wiring area;
a substrate;
a plurality of signal lines, wherein at least part of the plurality of signal lines are located in the display area, and the plurality of signal lines extend in a first direction and are arranged in a second direction, wherein the first direction intersects the second direction;
a plurality of connection lines, wherein at least part of the plurality of connection lines are located in the wiring area, and the plurality of connection lines comprises a first connection line, and the first connection line is located on a side of the signal line facing away from the substrate;
a first wire changing layer, wherein the first wire changing layer is located between the display area and the wiring area, and the first wire changing layer is located on a side of both the signal line and the connection line facing away from the substrate, and wherein the first wire changing layer is electrically connected to the signal line through a first via hole and is electrically connected to the first connection line through a second via hole;
at least one protection line, wherein in the first direction, the at least one protection line is located between the wiring area and the display area, and the at least one protection line is in a same layer as the first wire changing layer; and wherein a voltage value applied to the signal line is a first voltage, a voltage value applied to the at least one protection line is a second voltage, and the first voltage is greater than or equal to the second voltage; and
a constant voltage low potential line, wherein the constant voltage low potential line is located on a side of the wiring area facing away from the display area and is electrically connected to the at least one protection line.

16. The array substrate of claim 15, further comprising:
a step area, wherein the step area and the frame area are located at adjacent two sides of the display area respectively; and
wherein the array substrate further comprises a flexible circuit board, and wherein the flexible circuit board is bound to the step area, and the constant voltage low potential line is electrically connected to the flexible circuit board.

17. The array substrate of claim 15, further comprising:
a step area, wherein the step area and the frame area are located at adjacent two sides of the display area respectively; and wherein
the array substrate further comprises: a display test circuit and a plurality of data lines, wherein the plurality of data lines is located in the display area, the display test circuit is located in the step area and comprises a plurality of second thin film transistors, a plurality of test signal lines and at least one test control line, and wherein each second thin film transistor of the plurality of second thin film transistors comprises a gate, a first electrode and a second electrode, the gate of the each second thin film transistor is electrically connected to the test control line, the first electrode of the each second thin film transistor is electrically connected to the test signal line, and the second electrode of each second thin film transistor is electrically connected to the data line; and
the constant voltage low potential line is electrically connected to the test control line.

18. The array substrate of claim 15, further comprising:
at least one second electrostatic discharge circuit and a second common electrode line, wherein the at least one second electrostatic discharge circuit and the second common electrode line are located on a side of the constant voltage low potential line facing away from the display area; and wherein,
a first end of the at least one second electrostatic discharge circuit is electrically connected to the constant voltage low potential line, and a second end of the at least one second electrostatic discharge circuit is electrically connected to the second common electrode line.

* * * * *